United States Patent [19]
Gillick et al.

[11] Patent Number: 5,715,367
[45] Date of Patent: Feb. 3, 1998

[54] APPARATUSES AND METHODS FOR DEVELOPING AND USING MODELS FOR SPEECH RECOGNITION

[75] Inventors: Laurence S. Gillick, Newton; Francesco Scattone, Medfield, both of Mass.

[73] Assignee: Dragon Systems, Inc., Newton, Mass.

[21] Appl. No.: 376,348

[22] Filed: Jan. 23, 1995

[51] Int. Cl.[6] .................................................. G10L 9/00
[52] U.S. Cl. ..................... 395/2.63; 395/2.54; 395/2.58; 395/2.59; 395/2.53
[58] Field of Search ........................... 395/2.52, 2.54, 395/2.58, 2.59, 2.63, 2.64, 2.65, 2.12, 2.53

[56] References Cited

U.S. PATENT DOCUMENTS 5,497,447  3/1996  Bahl et al. .............................. 395/2.54

OTHER PUBLICATIONS

Hwang, and Huang, *Shared-Distribution Hidden Markov Models for Speech Recognition*. IEEE Transactions on Speech and Audio Processing, vol. 1 (1993).

Bahl, deSouza, Gopalakrishnan, Nahamoa, and Picheny, *Decision Trees for Phonological Rules in Cotinuous Speech*, in IEEE International Conference on Acoustics, Speech, and Signal Processing, 1991.

Hwang, Huang, and Alleva, *Predicting Unseen Triphones With Senones*, in IEEE International Conference on Acoustics, Speech, and Signal Processing, 1993.

Young, Odell, and Woodland, *Tree-Based State Tying for High Accuracy Modelling*, ARPA Human Language Technology Workshop, Mar. 8–11, 1994.

Woodland, Leggetter, Odell, Valtchev and Young, *The Development of the 1994 HTK Large Vocabulary Speech Recognition System*, ARPA Spoken Language System Technology Workshop, Jan. 22–25, 1995.

Bahl, Balakrishnan-Aiyer, Franz, Gopalakrishnan, Gopinath, Novak, Padmanabhan, and Roukos, *Performance of the IBM Large Vocabulary Continuous Speech Recognition System On the ARPA NAB News Task*, ARPA Spoken Language System Technology Workshop, Jan. 22–25, 1995.

Nguyen, Makhoul, Schwartz, Kubata, LaPre, Yuan, Zhao, Anastasakos, and Zavaliagkos, (draft) *The 1994 BBN/BYBLOS Speech Recognition*, ARPA Spoken Language System Technology Workshop, Jan. 22–25, 1995.

*Primary Examiner*—Krista M. Zele
*Assistant Examiner*—Daniel S. Hunter
*Attorney, Agent, or Firm*—Edward W. Porter

[57] ABSTRACT

A computerized system time aligns frames of spoken training data against models of the speech sounds; automatically selects different sets of phonetic context classifications which divide the speech sound models into speech sound groups aligned against acoustically similar frames; creates model components from the frames aligned against speech sound groups with related classifications; and uses these model components to build a separate model for each related speech sound group. A decision tree classifies speech sounds into such groups, and related speech sound groups descend from common tree nodes. New speech samples time aligned against a given speech sound group's model update models of related speech sound groups, decreasing the training data required to adapt the system. The phonetic context classifications can be based on knowledge of which contextual features are associated with acoustic similarity. The computerized system samples speech sounds using a first, larger, parameter set; automatically selects combinations of phonetic context classifications which divide the speech sounds into groups whose frames are acoustically similar, such as by use of a decision tree; selects a second, smaller, set of parameters based on that set's ability to separate the frames aligned with each speech sound group, such as by used of linear discriminant analysis; and then uses these new parameters to represent frames and speech sound models. Then, using the new parameters, a decision tree classifier can be used to re-classify the speech sounds and to calculate new acoustic models for the resulting groups of speech sounds.

16 Claims, 19 Drawing Sheets

-Training~130
    -record speakers reading or dictating speech~132
    -convert recorded speech into p-dimensional parameter vectors representing the speech signal in successive time frames~136
    -time align these vectors against PIC models representing the successive phonemes in a transcript of the recorded speech~138
    -for each PIC node of each PIC which occurs one or more times in the transcript~142
        -associate with it all vectors time aligned against it~144
    -call BuildTreeSet with TreeSet equal to FirstTreeSet to build a first set of decision trees, one for each of three nodes of a generalized PIC model created for each phoneme, to cluster the PIC nodes for each phoneme according to the phonetic context of their PIC and acoustic similarity~149
    -call LinearDiscriminantAnalysis to calculate a pxq L matrix which generates a new set of q parameters, where q<p, which discriminate well between the groups of vectors associated with the different end nodes of the first tree set~216
    -for each PIC node~244
        -use the L matrix to convert each of its original frame vectors into a new vector using the q new parameters~246
    -call BuildTreeSet with TreeSet equal to SecondTreeSet to build a second set of decision trees, similar to the first, to cluster the PIC nodes using the new q-dimensional vectors, and to mark as SimilarAncestorNodes intermediate nodes of each tree whose associated vectors are similar~248
    -for each SimilarAncestorNode in the second tree set~254
        -call LBGClustering to cluster the vectors associated with that SimilarAncestorNode into upto 16 clusters and then create a gaussian basis component corresponding to each such cluster~256
        -call EMRelaxation to modify the basis components associated with the SimilarAncestorNode to better model the vectors associated with that node's branch of its tree and to create a weighted mixture model for the SimilarAncestorNode based on those modified basis components~258
    -call InitialBWTraining to create initial PEL mixture models for each end node of the secont tree set and to determine the appropriate weighting for those mixture models~324
    -save a representation of the second set of trees~380
    -save the basis sets~382
    -save the mixture models associated with each PEL~384
    -save the L matrix~386
    -return~388

FIG. 4

-BuildTreeSet(TreeSet)~150
    -for each phoneme~166
        -for each node in phoneme's generalized PIC model~168
            -create a root tree node~170
            -call the recursive ExtendTree routine with the root tree node as TreeNode, with the current value of TreeSet, and with PICNodeSet equal to all PIC nodes with the curent node position in any PIC for the current phoneme~172
    -return~174

FIG. 8

-ExtendTree(TreeSet, TreeNode, PICNodeSet)~164
    -for each phonetic classification rule~176
        -split the tree node's PICNodeSet into two sub-groups: those whoes associated phonetic context do and do not match the classification rule~178
        -if either of these sub-groups has less than MinVectorThreshold vectors associated with its PIC nodes, skip to next iteration of "for" loop, if any~180
        -for each of two sub-group~182
            -calculate an average mean and variance from the means and variances of its PIC nodes, weighted by the number of vectors in each PIC node~186
            -set Likelihood equal to the sum, over all of the sub-group's vectors, of the likelihood of each vector given a guassian probability distribution defined by the sub-group's mean and variance~188
        -set RuleLikelihood equal to the sum of the Likelihoods for each of the two sub-groups~184
    -if no RuleLikelihood has been calculated~190
        -mark the current node as an end node~192
        -return~194
    -find the classification which has the best RuleLikelihood score and set BestRuleLikelihood to that best score~196
    -set TreeNodeLikelihood equal to the sum, over all vectors in the PICNodeSet, of the likelihood of that vector given a unimodal probability distribution based on a weighted average of the means and variations of the tree-node's PICNodeSet~198
    -if TreeSet equals SecondTreeSet~200
        -if BestRuleLikelihood minus TreeNodeLikelihood is less than SimilarAncestorThreshold~202
            -mark the tree node as a SimilarAncestorNode~204
    -if the difference between BestRuleLikelihood and TreeNodeLikelihood is greater than the EndNodeThreshold for the current TreeSet~206
        -create a new tree node corresponding to each of the two sub-groups of PIC nodes produced by the classification rule having the BestRuleLikelihood~208
        -for each of the two new tree nodes~210
            -call ExtendTree for the tree node, with the current value of TreeSet, and with PICNodeSet equal to the tree node's associated set of PIC nodes~212
    -Return~214

FIG. 10

-LinearDescriminantAnalysis~218
    -set the WithinGroupCovarianceMatrix W for the vectors grouped by the first tree set nodes equal to the average, weighted by the number of vectors per end node, of the covariance matrices of the groups of vectors associated with each end node~220
    -find a pxp matrix L1 which rotates and scales the axis of the space defined by the original p parameters to create a space in which W becomes an identity matrix~228
    -for each end node, find the mean of the vectors associated that each end node in the space defined by the L1 matrix~230
    -set the BetweenGroupCovarianceMatrix B for the end node groups equal to the covariance matrix of these transformed means~232
    -solve for the eigenvectors of B, and keep the q which have the largest eigenvalues~236
    -find a pxq matrix L2 which will rotate and project the p-dimensional L1 space into an q dimensional L2 space in which each of the q eigenvectors is parallel to an axis~240
    -set the pxq L matrix equal to L1 x L2~242
    -return~244

FIG. 11

-LBGClustering(SimilarAncestorNode)~260
    -place all frame vectors associated with SimilarAncestorNode into one cluster~262
    -until either have 16 clusters or the sum of variances of all clusters is less than StopLBGThreshold~266
        -for each of the SimilarAncestorNode's clusters existing when this step is started which has more than MinLBGVectorThreshold-268
            -find largest direction of variation between cluster's vectors in n-dimensional space~272
            -split cluster into two clusters at its mean in that direction~274
        -for each of a fixed number of times~270
            -places each vector into the cluster it is closest to~282
            -if there is any change in cluster membership, recalculate the clusters' mean based on the new membership~284
    -for each cluster produced~286
        -create a corresponding basis component having the n-dimensional mean and variance of the cluster and add that basis component to a BasisSet associated with the current SimilarAncestorNode~288
    -return~292

FIG. 24

-EMRelaxation(SimilarAncestorNode)~259
    -for one or more iterations~296
        -for each basis component of the SimilarAncestorNode's BasisSet~298
            -set component's WeightSum, WeightedVectorSum, and WeightedVarianceSum to zero~300
            -for each frame vector associated with SimilarAncestorNode~302
                -compute and save Prob, the probability of the vector given the basis component's probability distribution~306
                -add Prob to WeightSum~308
                -add (Vector x Prob) to WeightedVectorSum~310
            -for each such vector~304
                -add ((Vector - Means)$^2$ x Prob) to WeightedVarianceSum~316
    -return~322

FIG. 34

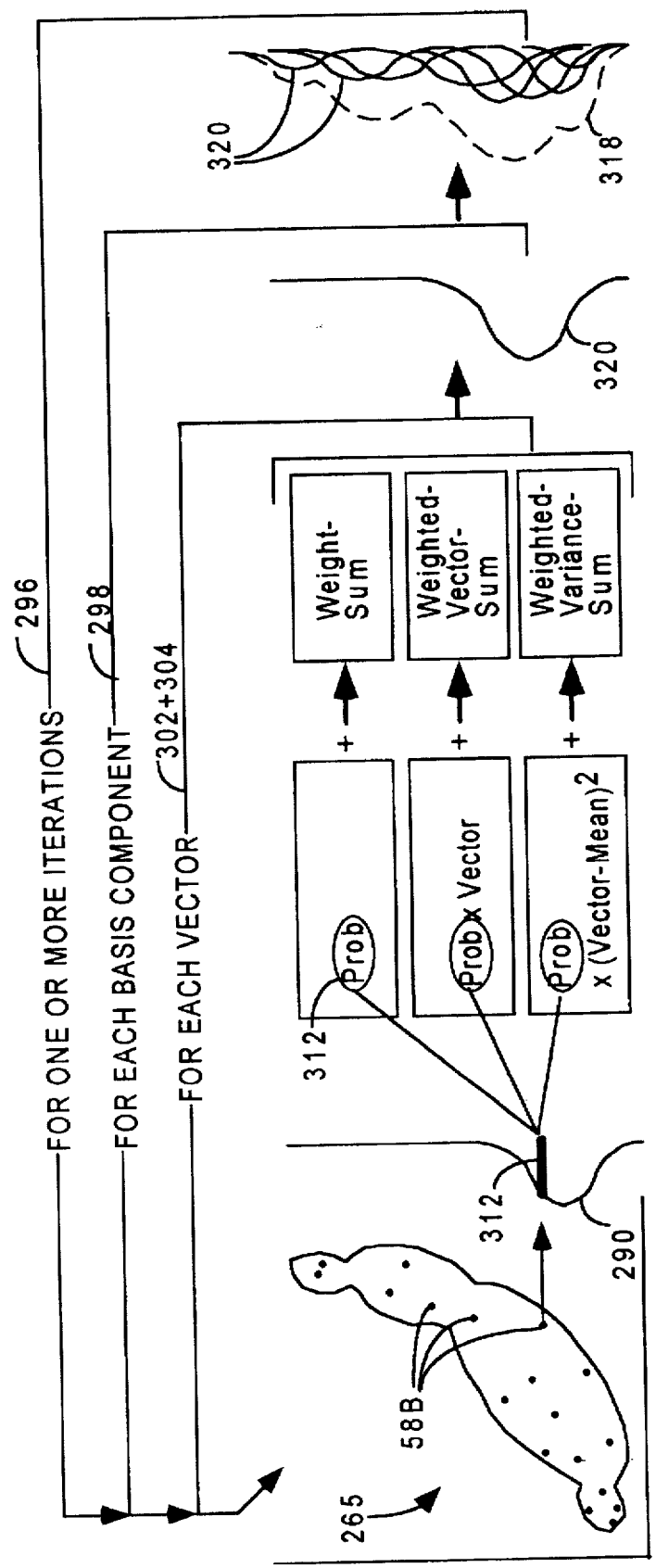

-InitialBWBatchTraining~326
    -for each end node of the second set of trees~328
        -create a PEL mixture model for the end node using the basis set of its SimilarAncestorNode, and having initial WeightSum, WeightedVectorSum, and WeightedVarianceSum for each component of that basis set equal to those of the SimilarAncestorNode.~330
    -call BWBatchTraining for training data~332
    -return~334

FIG. 36

-BWBatchTraining(TrainingData, Script)~336
    -for one or more iterations~338
        -probabilistically time align the training data's sequence of frame vectors against the sequence of PEL mixture models defined by the PICs of the training script, to create a PELProb for each probabilistic time alignment of a vector against a PEL, indicating the probability of that vector corresponding to that PEL~340
        -for each end node in SecondTreeSet~342
            -call BWPELTraining for its PEL and the list of vectors time aligned against and the PELProb for each such vector~344
    -return~346

FIG. 37

-BWPELTraining (PEL, VectorList, PELProbList)~356
    -for each basis component of the PEL~358
        -for each vector in the VectorList and it associated PELProb in the PELProbList~360
            -set ComponentProb equal to the likelihood of the vector given the basis component's probability distribution~362
            -set Prob = (PELProb + ComponentProb)~364
            -add Prob to component's WeightSum for PEL itself~366
            -add Prob to component's WeightSum for PEL's SimilarAncestorNode~368
            -add (Vector x Prob) to component's WeightedVectorSum for PEL's SimilarAncestorNode~370
            -add ((Vector - (WeightedVaranceSum / WeightSum))$^2$ x Prob) to component's WeightedVarianceSum for the PEL's SimilarAncestorNode~372
    -return~374

FIG. 39

-FastDemon~388
    -...
    -convert each successive frame period of the speech to be recognized into a corresponding frame vector having the original set of p parameters~390
    -use the L matrix to convert the resulting sequence of p-dimensional frame vectors into a corresponding sequence of new q-dimensional frame vectors~392
    -place recent frames into a FIFO frame buffer~394
    -if detect an utterance call Recognition routine~396
    -...

FIG. 40

--Recognition~398
    -score the utterance start against a prefilter model for each word model in the vocabulary~402
    -limit active word model candidates to the NumberToPassPrefilter words with best scoring prefilter scores~404
    -for each active word candidate~406
        -create an initially empty acoustic word model in RAM~408
        -for each phoneme in words phonetic spelling~410
            -define a PIC according to the phoneme and its phonetic context~412
            -for each node in the PIC~414
                -add to the word acoustic model's the PEL associated with that PIC node by the decision tree~416
    -for each successive frame of the utterance in frame buffer until scoring of all active word candidates is complete~418
        -for each active word model candidate~420
            -use the frame to update the relative score of the match of the acoustic word model against the frame sequence of the current Utterance~422
            -if the word model's score is worse than ScoreThreshold, remove it from the list of active word model candidates~426
    -place word IDs of the up to NoOfWordsToReturn best scoring words from the active vocabulary which score above a given threshold, and their corresponding scores, in a results buffer~428
    -erase the acoustic word models for this recognition~430
    -return with a pointer to the results buffer~432

FIG. 41

. AdaptiveTraining~440
    -for each recognized PEL whose model occurred one or more times in the recognized word~442
        -call BWPELTraining for the PEL and the list of vectors time aligned against it in the word, with the PELProb for each such vector being a function of the words score~444
        -for each other PEL which shares the same SimilarAncestorNode~446
            -call BWPELTraining for the PEL and the list of vectors time aligned against it in the word, with the PELProb for each such vector being a function of the words score and the similarity between the mixture models of the recognized PEL and the other PEL~448

FIG. 43

APPARATUSES AND METHODS FOR DEVELOPING AND USING MODELS FOR SPEECH RECOGNITION

FIELD OF THE INVENTION

The present invention relates to apparatuses and methods for developing and using models for speech recognition.

BACKGROUND OF THE INVENTION

Systems capable of performing speech recognition are well known in the prior art. They respond to the sound of a given spoken word by producing the textual spelling, or some other symbolic output, associated with that word. Most such systems operate by comparing a representation of the sound of the words to be recognized against models of the sound of known vocabulary words, and then they pick the best scoring vocabulary words as being recognized.

FIG. 1 provides a slightly more detailed description of the way some prior speech recognition systems operate. A user 50 speaks into a microphone 52. The microphone generates an analog electric signal 54, the voltage of which varies over time in correspondence with the variations in air pressure caused by the user's speech. Then in step 56 A-to-D, or analog to digital, conversion and DSP, or digital signal processing, is performed upon the signal. In the A-to-D conversion, the voltage of the analog signal 54 is sampled and converted into a corresponding digital value, normally between 6,000 to 16,000 times per second. Then DSP is performed upon the resulting digital representation of the sound waveform. The DSP produces a series of frame vectors 58, normally at a frequency between 50 to 100 times per second. Each such vector represents the sound of the waveform during its corresponding time frame with a common, ordered set of n parameter values. The n parameter values 60, shown in FIG. 2, associated with each vector can be viewed as representing its associated sound as a point in an n-dimensional space defined by the n parameters.

Such vectors commonly include a plurality of parameters produced by an FFT, or fast Fourier transform. Each FFT parameter represents the energy of the sound at one of a plurality of frequency ranges during the vector's time frame. In FIG. 1 each vector is shown having twelve FFT parameter, which together provide a spectral representation of sound, with the frequency represented by each parameters increasing in the vertical direction. The actual number of FFT parameters used can vary from system to system, and many systems use other types of parameters in place of, or in addition to FFT parameters. For example, many systems use cepstral parameters, or parameters based on the first or second derivative of cepstral parameters. Cepstral parameters provide frequency-related information somewhat similar to that provided by an FFT, but they focus on the part of the speech signal which is generally considered most relevant to speech recognition.

Once a series 62 of vectors, or frames, 58 is produced which represents the sound of an utterance to be recognized, that series is matched, or scored, against each of a plurality of word models 64, each of which corresponds to a given vocabulary word 66, to find which of those word's models the series of frames most closely matches. The resulting scores are used to pick which word corresponds to a given sequence of vectors.

In systems sold by Dragon Systems, Inc., the assignee of the present invention, each word model 64 is usually comprised of a plurality of "PEL"s, or phonetic elements, 68.

Each PEL is a model of a speech sound that can occur in one or more different words. The PEL model contains a series of probability distributions 70, shown in FIG. 2, one corresponding to each parameter found in the frames 58. Each such probability distribution represents the distribution of values for the corresponding parameter in frame vectors corresponding to the speech sound modeled by the PEL. Just as the n parameters of each vector describe a point in an n-dimensional space, the n probability distributions of each PEL combine to describe an n-dimensional probability distribution of such points.

Prior systems have modeled n-dimensional PEL probability distributions by use of "mixture models", that is, weighted sums of up to some number, such as sixteen, n-dimensional gaussian probability distributions 75. The set of such distributions is called a basis set, and each of the individual distributions in the set is called a basis component. In FIG. 2 a set of eight such basis components are shown for one of a PEL's parameters, which portrays each such distribution along only one of its n dimensions. The distribution represented by such a weighted sum of gaussian curves can do a much better job of representing the distribution of frames associated with a given PEL than a distribution modeled by a single gaussian curve. This is because all distributions modeled by a single gaussian curve have only one basic shape, the so-called "bell curve". The only things about such a bell curve distribution that can be changed are the location of its center, or mean, and its width, or variance, in each dimension, and it's height, or weight. In a mixture model, on the other hand, the mean and variance in each dimension, and weight of each component bell-curve can be varied separately. This enables the distribution represented by a mixture model to more accurately represent the complex shape commonly created by the distribution of PELs associated with the vectors which represent a given speech sound in n-dimensional space.

In prior speech recognizers made by Dragon Systems, Inc. the sequence of individual PELs 68 associated with each word model 64 is derived from the phonetic spelling 72 of its associated vocabulary word 66, as indicated in FIG. 1. This phonetic spelling consists of a sequence of phonemes 74 similar to that in the phonetic spelling of the word in a normal dictionary. In the word model, each phoneme in the vocabulary word's phonetic spelling is represented by what researchers at Dragon Systems, Inc. call a "PIC", or phoneme-in-context, 76.

A PIC is a sequence of PELs which represents the sequence of sounds associated with a given phoneme when it occurs in a given phonetic context. Commonly a PIC represents the sound of a phoneme in a triphone context, that is, in the context defined by three phonemes, the phoneme of the PIC, itself, the phoneme which immediately precedes the PIC's phoneme in the word's phonetic spelling, and the phoneme in which immediately follows the PIC's phoneme that phonetic spelling. In a discrete word recognizer, that is, a recognizer designed to recognize individual words each preceded and followed by a pause, phonemes which occurs at the start and end of a word's phonetic spelling, are treated as being preceded or followed, respectively, by a silence phoneme, as is indicated by "φ" in FIG. 1. In a continuous speech recognizers, that is, a system designed to recognize speech without any pause between words, the preceding phonetic context for a phoneme occurring at the start of a word is that of the last phoneme of the word which preceded it, and the following phonetic context for a phoneme at the end of a word is that of the first phoneme of the word which follows it.

PICs are commonly represented as a sequence of three PIC nodes, each of which is represented by a PEL. These three PELs represent a phoneme occurring in a given triphone context as a sequence of three sounds. It is valuable to represent phonemes as a sequence of sounds rather than just one sound, because the human vocal tract is something like a slide trombone, in that sense the sounds produced by speech are not only defined by the position of speech articulators such as the tongue, lips, and jaw at target positions associated with the individual phonemes, but also by intermediate positions of those articulators as they make the transition from the target positions associated with one phoneme to that associated with the next.

The score produced for each vocabulary word 66 is calculated by seeking to time align the sequence 62 of frames of the speech to be recognized against the word's sequence of PEL models 68. This time alignment is represented in FIG. 1 by the upward pointing brackets 82 which indicate which frame vectors 58 have been time aligned against which PELs 68. This time alignment is done using well known methods, such as Hidden Markov Modeling, to seek to maximize, over all of the frames of the speech to be recognized, the product of the probability 78, as shown in FIG. 2, of the n-dimensional point 80 associated with each frame vector, as defined by the n-dimensional probability distribution 70 of the PEL. In FIG. 2 the point 80 and the probability 78 are shown in the single dimension associated with a given parameter 60, but one can merely multiply the probability produced in each dimension to get the total probability for all n dimensions used by the vectors and PELs.

To simplify calculations, probabilities can be represented by their logarithms, so the product of probabilities can be calculated by merely by summing their corresponding logarithms. In this specification we will refer to a logarithm of a probability as a "likelihood". This enables likelihoods over all parameter dimensions to be summed to produce a logarithm of the probability of the vector belonging to the PEL's probability distribution, and the summing of the resulting likelihood sums over all the PEL's of a word model to get a score representing the log of the probability that the sequence of frames time aligned against a word's model actually is an utterance of that word. This score can be used to represent which of many words most probably belongs to a given sequence of frames.

In the example of FIG. 1, the word model of the word "he" is shown as matching the sequence of frames to be recognized much better than the word model of the word "read". Thus, "he" is more likely to be selected as the recognized vocabulary word. In a large vocabulary recognizer many thousands of words have at least some sort of model compared against a sequence of frames to be recognized.

The above description of the basic operation of a speech recognition system is a highly simplified one. More detailed descriptions of prior speech recognition systems are given in U.S. Pat. Nos. 4,783,803, issued to James K. Baker et al. on Nov. 8, 1988, and entitled "Speech Recognition Apparatus And Method"; U.S. Pat. No. 4,903,305, issued to Laurence Gillick et al. on Feb. 20, 1990, and entitled "Method for Representing Word Models For Use In Speech Recognition"; U.S. Pat. No. 4,866,778, issued to James K. Baker on Sep. 12, 1989, and entitled "Interactive Speech Recognition Apparatus", and U.S. Pat. No. 5,027,406, issued to Jed Roberts et al. on Jun. 25, 1991, and entitled "Method For Interactive Speech Recognition And Training". The patents have all been assigned to the assignee of the present invention, and they are all hereby incorporated by reference herein.

SUMMARY OF THE INVENTION

It is an object of the present invention to provide apparatuses and methods for developing and using models of speech sounds which provide good speech recognition while requiring less storage and less computation during recognition.

It is another object of the present invention to provide apparatuses and methods for developing and using models of speech sounds which share model components in a manner which provides good recognition and which will continue to model speech sounds well when new training data is used to update those models.

It is still another object of the present invention to provide apparatuses and methods which reduce the amount of memory required to run a speech recognizer.

It is yet another object of the present invention to provide apparatuses and methods for developing and using models of speech sounds which allow training data for a few of speech sounds to appropriately update models for a larger number of speech sounds.

The present invention relates to methods and apparatuses for developing and using models of speech sounds, such as PELs, for use in speech recognition. According to one aspect of the present invention, a computerized system shares model components between phonetically classified groups of speech sounds whose phonetic classifications are related. The system time aligns frames of training data against models of the speech sounds contained in that data. Then it automatically selects a plurality of sets of phonetic context classifications which divide the speech sounds into groups time aligned against acoustically similar frames. It creates model components, such as basis components, from the frames from different groups which share sub-sets of such classifications, using these model components to build a separate model, such as a PEL model, for each of the groups of speech sound which share them.

In a preferred embodiment of this aspect of the invention, a decision tree classifier is used to classify the speech sounds. The groups of speech sounds which share model components are the groups of speech sounds associated with nodes of a decision tree which share a common ancestor node in the tree. In preferred embodiments, when new speech samples are obtained, their frames are time aligned against the models of speech sound groups and the information in the frames aligned against a given speech sound group model are used to update the models of speech sound groups which share a common ancestry in the decision tree, decreasing the amount of data required to adapt a large number of speech sound groups to a new speaker, or to a change in a speaker's voice. It is preferred that the set of classifications available for use by the decision tree classifier be selected by humans based on linguistic knowledge of which features are likely to be associated with acoustic similarity. This greatly increases the chance that the speech sounds grouped together based on given training data will represent phonetically similar sounds that are likely to remain similar when new training data, or new speakers, are used with them.

This aspect of the invention has benefits because the sharing of model components between speech sound groups reduces the amount of memory which is required to store the speech sound group models and it reduces the amount of computation required to compare frames to be recognized against multiple speech sound models. The sharing of models components between speech sound groups which not only have acoustically similar frames but also share related phonetic context classifications, greatly increases the chance that the sharing of model components between such groups is appropriate, and will continue to be appropriate even when the groupings of speech sounds are applied to new training data and new speakers.

According to another aspect of the invention a computerized speech system selects a reduced set of parameters to be used in models of speech sounds and the vectors which represent speech to be recognized. The reduced set of parameters is selected to well separate different groups of speech sounds which have been grouped by both phonetic classification and the similarity within each group of its associated speech frames. The system samples speech sounds using a first, relatively large, parameter set; automatically selects combinations of phonetic context classifications which divide the speech sounds into groups whose frames are acoustically similar; selects a smaller set of parameters based on that set's ability to separate the frames of each speech sound group; and then uses these new parameters to represent frames and speech sound models.

In a preferred embodiment of this aspect of the invention, a decision tree classifier is used to group the speech sounds according to their phonetic context, and linear discriminant analysis is used to select an L matrix which will convert the first set of parameters into the smaller set of parameters which do a relatively good job of separating the different groups of speech sounds formed by the decision tree. Preferably the set of potential rules available to the decision tree classifier are rules of phonetic context features which have been selected based on human knowledge of which phonetic contexts are likely to produce acoustically similar speech sounds. It is also preferred that once the second, smaller set of parameters has been selected, the frames of the training speech are represented by vectors using the new set of parameters. Once this has been done, a decision tree classifier using phonetic context rules builds a second decision tree to re-classify the speech sounds based on the new vectors associated with each; and then an acoustic model, using the new parameter set, is calculated for each group of speech sounds created by the second decision tree.

Using a reduced set of parameters to represent the models of speech sound groups saves memory, by reducing the number of parameters which have to be saved for each model. It also saves computation by reducing the number of parameters which have to be compared for each frame against each speech sound model. In general, using LDA to select a reduced set of parameters can improve a speech recognizers ability to separate groups of speech sounds by reducing the often negative impact on such separation caused by variations in parameters that are not particularly relevant. Using LDA which select such a reduced set of parameters that has been optimized to separate speech sound groups grouped both on similarity of their acoustic training data and phonetic contexts, significantly increases the ability of the reduced set of parameters to properly separate speech sounds when used with new training data and new speakers.

According to another aspect of the invention a computerized speech recognition system uses decision trees of the type described above, which are used to classify speech sounds into groups and to develop an acoustic model for each such group. It uses these decision trees to map which speech sound group model should represent a given speech sound in a given word or sequence of words. It does this by using the classification rules associated with the various nodes of such a tree to determine with which group of speech sounds the decision tree would group the given speech sound, given its phonetic context in the given word or words.

Using such decision trees to map between speech sounds and their models is advantageous because, where the number of possible speech sounds is very large. the set of decision trees necessary to perform such a mapping often takes much less storage in memory than a look-up table mapping each possible speech sound to its associated model. This space savings is especially important in a system in which acoustic models of words are created and destroyed dynamically during recognition. because in such systems a means for performing such mapping normally has to remain loaded in RAM continuously during the recognition process.

DESCRIPTION OF THE DRAWINGS

These and other aspects of the present invention will become more evident upon reading the following description of the preferred embodiment in conjunction with the accompanying drawings, in which:

FIG. 4 is a simplified pseudo-code representation of a Training program which builds models for use in speech recognition according to the present invention.

FIG. 8 is a simplified pseudo-code representation of the BuildTreeSet routine which is called by the Training program of FIG. 4 to build a set of decision trees.

FIG. 10 is a simplified pseudo-code representation of the recursive ExtendTree routine which is initially called by the BuildTreeSet routine of FIG. 8 at the root node of the decision tree built for each node of each generalized PIC model for the purpose of building the nodes of each such decision tree.

FIG. 11 is a simplified pseudo-code representation of the LinearDiscriminantAnalysis routine which is called by the Training program of FIG. 4 to calculate a reduced number of parameters which do a good job of separating the distributions of frame vectors associated with the different groups of PIC nodes formed by the end nodes of the first tree set.

FIG. 24 is a simplified pseudo-code representation of the LBGClustering routine which is called by the Training program of FIG. 4 to cluster the frame vectors associated with each SimilarAncestorNode in the second set of decision trees for the purpose of calculating a set of basis components to represent the distribution of the vectors associated with each SimilarAncestorNode.

FIG. 34 is a simplified pseudo-code representation of the EMRelaxation routine called by the Training program of FIG. 4 to iteratively calculate the basis set and mixture model for the distribution of vectors associated with each SimilarAncestorNode in the second tree set.

FIG. 35 is a schematic diagram used to explain the operation of the EMRelaxation routine of FIG. 34.

FIG. 36 is a simplified pseudo-code representation of the InitialBWBatchTraining routine which is called by the Training program of FIG. 4 to perform initial Baum-Welch training of the PEL models associated with each end node in the second tree set.

FIG. 37 is a simplified pseudo-code representation of the BWBatchTraining routine which is called by the InitialB-WBatchTraining routine, and by other possible programs not shown, to perform Baum-Welch training on PEL models.

FIG. 39 is a simplified pseudo-code representation of the BWPELTraining routine which is called by the BWBatchTraining routine of FIG. 37 and by the AdaptiveTraining routine of FIG. 43 to perform Baum-Welch training on individual PELs.

FIG. 40 is a partial, simplified pseudo-code representation of a FastDemon routine, which is called many times a second in a discrete word speech recognition system using the present invention to perform signal processing, utterance detection, and to call the Recognition routine of FIG. 41 for any utterance which is detected.

FIG. 41 is a simplified pseudo-code representation of the Recognition routine called for an utterance by the FastDemon routine of FIG. 40 to perform discrete word recognition.

FIG. 43 is a simplified pseudo-code representation of an AdaptiveTraining routine which can be used in a speech recognition system employing the present invention to adaptively train a given PEL against which new speech frames have been time aligned, and to also update PEL which are related to that given PELs in the second tree set.

DETAILED DESCRIPTION OF PREFERRED EMBODIMENTS

Figure 3:
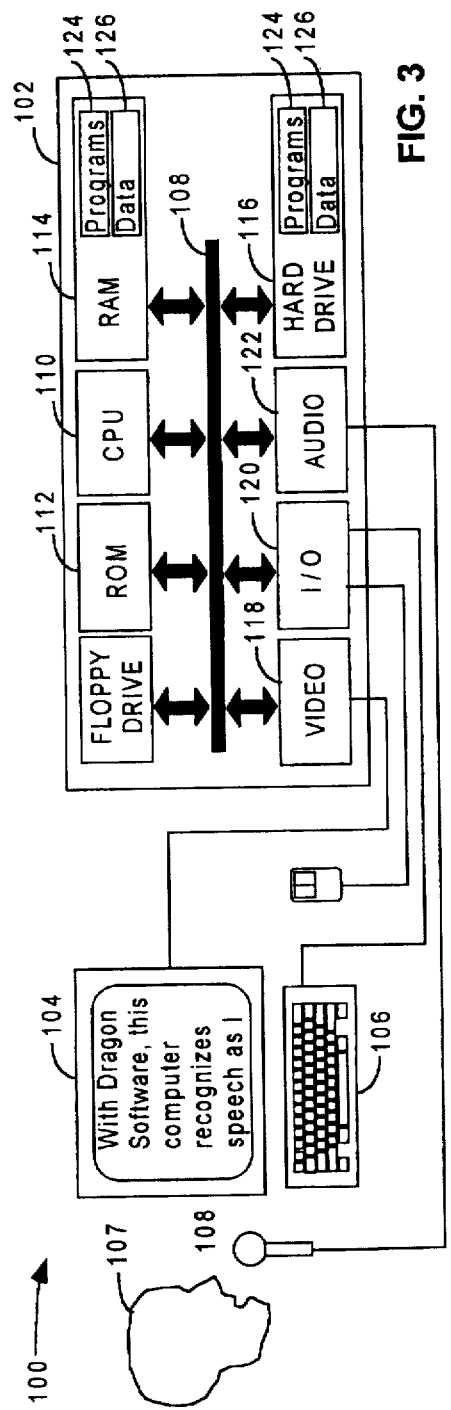
FIG. 3 is a schematic representation of a computer system programmed to operate as apparatus for performing the functions of the present invention.

FIG. 3 represents an apparatus for performing the speech recognition related functions of the present invention. This apparatus, 100, includes a computer 102, which is preferably a personal computer or a computer workstation, a video display 104, a keyboard 106, and a microphone 108. The computer 102 includes, among other things, a bus 108 over which its various components can communicate with each other; a CPU, or central processing unit, 110 for reading and executing program instructions; a portion of read-only memory, or ROM, 112 for storing essential program information when the computer is turned off; a portion of random-access memory, or RAM, 114 for storing the majority of programs and data used by the CPU, a hard disk 116 for storing large amounts of programs and data, a video interface 118 for controlling the display on the video monitor under CPU control; a input/output interface 120 for receiving input from the keyboard and mouse, and a sound board 122 for receiving the analog waveform representing the sound received by the microphone and converting it into a digital representation. In some embodiments the audio card 122 also performs the digital signal processing, or DSP, on the digital representation of the sound wave form. In other embodiments the CPU performs that DSP function.

As is well known in the prior art, the CPU 110, is a piece of circuitry designed to execute instructions recorded in the ROM and RAM memories 112 and 114, respectively. In response to those instructions, it is capable of reading and writing information from various devices connected to it over the bus 108, and for performing tests and calculations based on that information. The CPU can cause programs and data to be copied from the hard disk 116 into RAM 114 so the CPU can execute those programs' instructions and read and write such data. In the present invention programs 124 and data 126 are copied from the hard disk into RAM which make the computer 102 into an apparatus capable of performing the functions of the present invention.

FIG. 4 is a highly simplified pseudo-code representation of a training program 130 embodying the present invention. This program selects a reduced set of parameters for use in representing frame vectors and PEL models, derives PEL models using that reduced set of parameters, and decides which of these PEL models should represent which PIC nodes of which PIC models, and which of these PEL models should share basis components. For purposes of simplification, the steps of FIG. 4 are all represented as part of one program. In actually these steps can be written as a set of separate programs which can be run either on one computer or on several computers.

Figure 5:
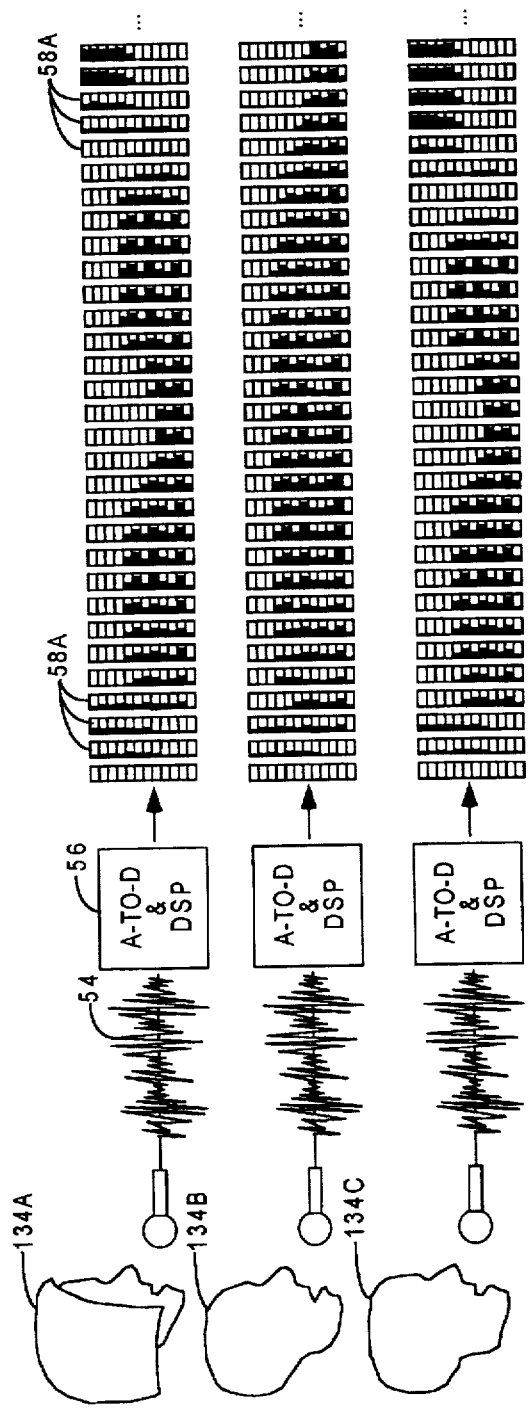
FIG. 5 is a schematic representation of the collection of frames of training data from multiple speakers used by the Training program of FIG. 4.

The first step of the Training program, step 132, involves having multiple speakers, such as the speakers 134A, 134B, and 134C in FIG. 5, read or dictate speech. Often the waveforms of this training speech are recorded on tape in a relatively high fidelity so that it can be used at different times by different training programs representing frames in different parameter sets. But it could be supplied directly from the microphone to analog to digital conversion and for digital signal processing, as indicated in FIG. 5. FIG. 5 illustrates a plurality of speakers 134 saying a initial portion of the script, "He reads books . . . ", indicating how the same word can be spoken at different rates and in a different manner.

Step 136 of the Training program uses digital signal processing 56 to convert the speech waveform into p-dimensional parameter vectors 58A of the type described above, where p is a larger number of parameters than the number of parameters intended for use in PEL models to be created by the Training program and the vectors to be scored against them. Often p is picked to be roughly twice the number of parameters which are desired for use in the PELs to be created. In a current embodiment of the invention the vectors are calculated at a frequency of one hundred times a second and p equals forty-four. The forty-four parameters used in this embodiment include eight FFT parameters, twelve cepstral parameters, twelve parameters based on the first derivative of cepstral parameters, and twelve parameters based on the second derivative of cepstral parameters.

Figure 1:
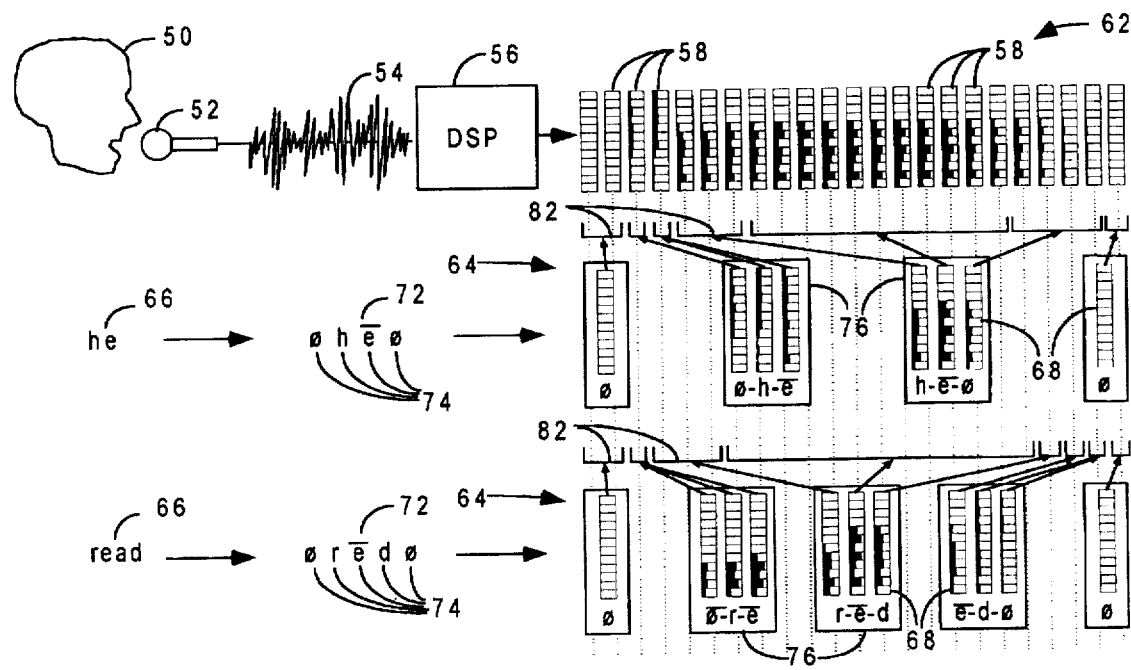
FIG. 1 is a schematic representation of certain prior an speech recognition systems.
Figure 2:
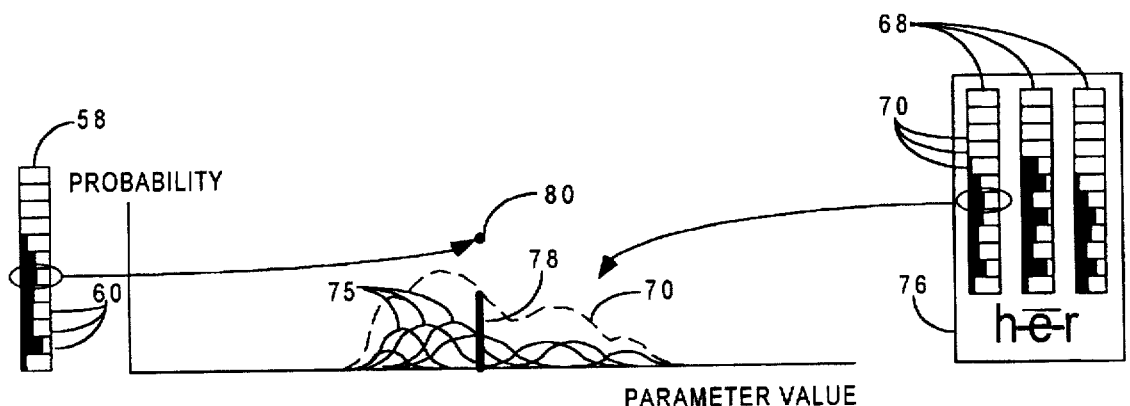
FIG. 2 is a schematic representation of a mixture model used to represent a PEL in certain prior art speech recognition systems and of the comparison of such a mixture model to a frame vector to calculate the probability that the frame corresponds to the PEL.
Figure 6:
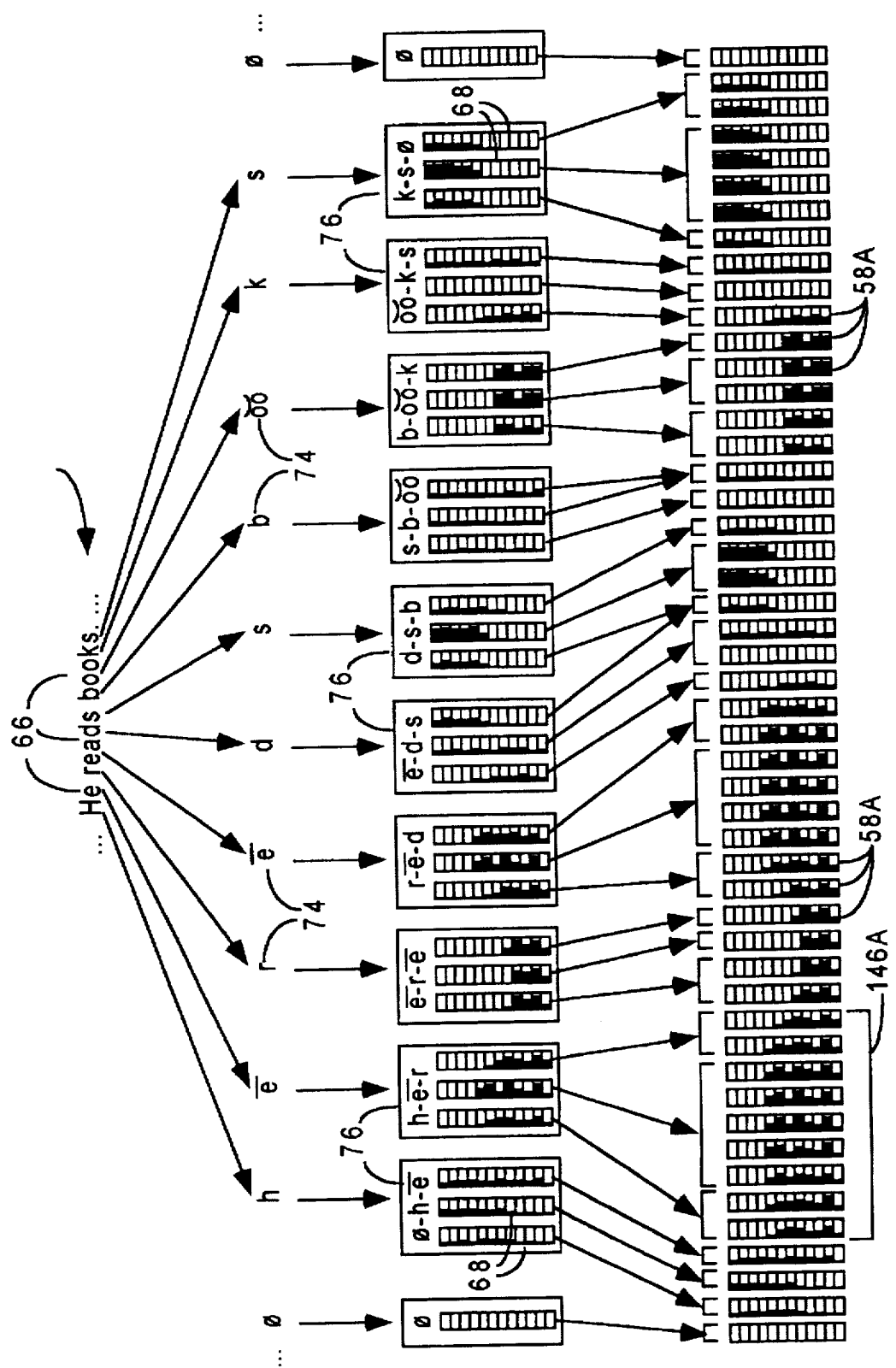
FIG. 6 is a schematic representation of the process of time aligning frames of training data against PEL and PIC node models performed by the Training program of FIG. 4.

In step 138 of the Training program the sequences of p-parameter vectors 58A produced by the different training speakers are time aligned against scripts 140 representing the words spoken in each such vector sequence. The time alignment is very similar to that described above with regard to FIGS. 1 and 2, except that there is no need to produce a score for each word, since the only purpose is to best align vectors against PELs. FIG. 6 illustrates such a time alignment being performed for the sequence of vectors produced by speaker 134A shown in FIG. 5. The sequence of PELs 68 against which the vectors are time aligned is derived from the sequence of PICs 76 which correspond to the sequence of phonemes 74 of the words 66 included in the training script 140.

The PELs 68 shown in FIG. 6 are initial PEL models which have been created by some other, previous training method. If the p-parameters vectors 58A are to be time aligned against them, the initial PELs should have the same p-parameters. If no prior p-parameter vectors exist, PELs using a different set of r parameters can be time aligned against a set r-parameter vectors derived from the recorded training speech. The computer can record the frame times of the r-parameter vectors aligned against each such r-parameter PEL, and then re-compute a p-parameters vector corresponding to each such frame time from the recorded speech and associate it with the PIC node of the PEL against which its frame time was aligned.

Once the time alignment of step 138 has been performed for a relatively large amount of speech from a relatively large number of speakers, step 142 performs step 144 for each node of each PIC which occurs one or more times in any of the scripts associated with the time aligned speech. In the current embodiment the vast majority of PICs 76 are represented by three PIC nodes, each of which represents a speech sound modeled by a PEL. A relatively small number of the PIC's, however, such as those representing diphthongs, are represented by four or five PIC nodes, and the silence phoneme is represented as a single node. In other embodiments other numbers of nodes per PIC could be used. For purposes of simplification, however, the description of the preferred embodiment below will assume all PICs are represented as tree PIC nodes.

Figure 7:
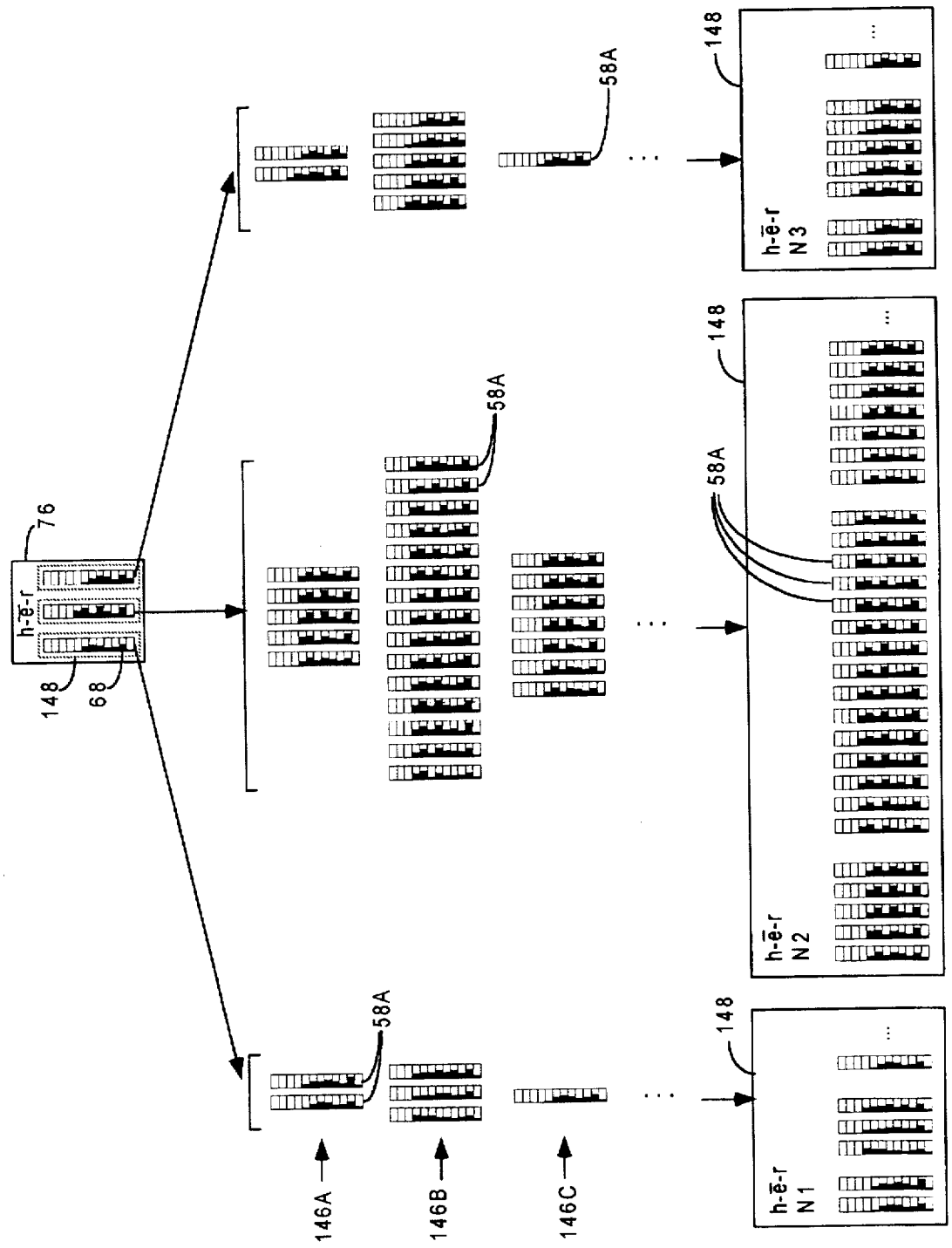
FIG. 7 is a schematic representation of the association between individual PIC nodes and all frames time aligned against all occurrences of each such node made by the Training program of FIG. 4.

As indicated in FIG. 7, step 144 of the Training program associates with each PIC node 148 of each PIC 76 which occurs in the training script all of the p-parameter vectors 58A which have been time aligned against that node from each speaker in each part of each script in which its associated PIC occurs. It should be noted that although PIC nodes 148 are represented by PELs, as indicated in FIG. 7, they are not identical with PELs, since a given PEL can occur in more than one PIC node. In FIG. 7, the vectors 58A in rows 146A, 146B, and 146C correspond to the vectors spoken by speakers 134A, 134B, and 134C, in FIG. 5 which have been time aligned against the PIC 76 representing the long "e" phoneme preceded by an "h" and followed by and "r". In the illustration of FIG. 7, the frames 146A shown correspond to the frames 146A shown in FIG. 6. Normally most PICs will have multiple sets of frame spoken by each speaker from different locations in the training script time aligned against them.

Although not indicated in FIGS. 4 and 7, step 144 also calculates for each PIC node the p-dimensional mean and variance of all the frames grouped with it. This is done to simplify computation later in the tree building process described next.

Once step 142 of the Training program is complete, step 149 calls the BuildTreeSet routine 150, described in FIG. 8, with TreeSet equal to FirstTreeSet. This is done to build a first set of decision trees 152, three of which are shown in FIG. 9, one for each of three generalized PIC nodes 154 of the generalized PIC model 156 created for each phoneme 74 of the type shown if FIGS. 1 and 6.

In general, decision tree classifiers are well known in the prior art. A decision tree is a tree shaped network of nodes used to classify elements according to their properties. In this network all non-terminal nodes, that is, all nodes except end nodes, have two or more child nodes and have an associated classification rule which will divide the elements which have been routed to it into the sub-classes associated with, and to be routed to, each of its child nodes. When elements to be classified are supplied to the root, or first, node of the tree, the root node's classification rule will be applied to divide those elements into sub-classes to be associated with, and to be routed to, each of its child nodes. This process is repeated at each node, for all of the elements routed to that node, until the elements reach the end nodes of the tree, by which time they will have been classified by the tree. Decision trees, such as the binary decision tree used in the preferred embodiment described below, have the advantage of being "complete classifiers", that is, of being able to assign all elements supplied to them to an end node, even if the element never occurred in the training data used to determine which classification rules should be assigned to which nodes of such trees.

One such embodiment uses forty-five phonemes to model the English language, forty-four of which are context dependent, and one of which, the silence phoneme, is treated as context independent. It creates a separate generalized PIC model 156 for each of the forty-four context dependent phonemes. For each such context dependent phoneme, there is a separate possible PIC for each possible combination of the forty-five preceding phonemes and the forty-five possible following phonemes, for a total of two thousand and twenty-five possible PIC's for each of the forty-four generalized PIC models 156, giving a total of eighty-nine thousand and one hundred PICs for the context dependent phonemes. Often training data will not exist for all of these possible PICs. But one of the advantages of the decision trees used with the present invention is that the phonetic context classification networks they develop, based on PICs for which they do have training data, will always be able to place a new PIC node for which they do not have training data in a group of PIC nodes. In fact, usually they will place the new PIC node in a group of such nodes which are similar to it, both in terms of acoustics and phonetic context.

Figure 9:
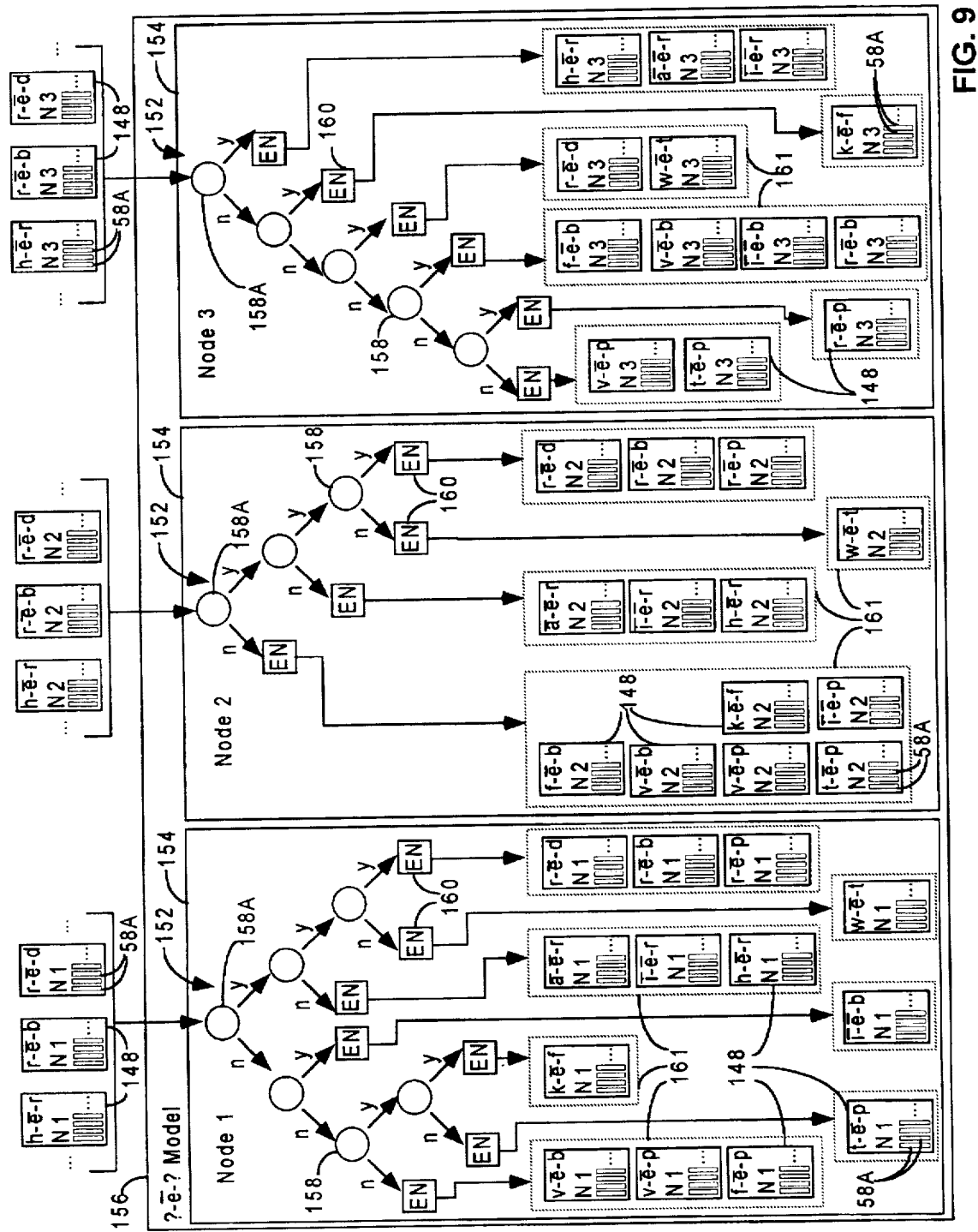
FIG. 9 is a schematic representation of the first set of decision trees built for each phoneme by the first call to the BuildTreeSet routine of FIG. 8 made by the Training program of FIG. 4.

FIG. 9 illustrates the creation of three decision trees 152 in the first set of decision trees for the generalized PIC model 156 of the phoneme long "e". The decision tree 152 created for each given generalized PIC node 154 of the generalized PIC model 156 receives at its root node 158A all the PIC nodes 148, with all of the vectors 58A time aligned against each such PIC node, of all PICs for its associated phoneme, which have the same node position in their PICs as the given generalized PIC node has in it associated generalized PIC 156. At each node 158 in the tree, except its end nodes 160, all of the PIC nodes which have reached the node are split according to whether or not the phonetic context defined by their associated PIC satisfies a certain classification rule, as is indicated, respectively, by the "y" and "n" at each node 158 in FIG. 9.

In the preferred embodiment each classification rule is defined by a preceding phoneme class and/or a following phoneme class, each of which is a list of one or more phonemes. Both to greatly reduce the number of classifications that have to be considered, and to increase the likelihood that the classification rules are meaningful, a human with knowledge of phonetics selects a set of classification rules available for used by the decision tree, such that all the phonemes of each phoneme class have a certain acoustically significant similarity, such as sharing a similar tongue or lip position. This human selection is important because the number of all possible classes of phonemes is in the trillions, and because the purpose of the decision tree is to group together PIC nodes whose phonetic contexts share similarities which speech science indicates are acoustically important.

Appendix A, provides an example of a list of the classification rules which are currently used for the English language with the preferred embodiment of the present invention. The phonetic context is represented by a set of phoneme symbols, corresponding roughly to those used in many dictionaries, each of which represents a phoneme. If a classification rule contains a set of phonemes occurring before an underscore character "_", the rule can only be met by a PIC node whose PIC triphone context has a preceding phoneme contained in the set of phonemes preceding the "_". Similarly, if a classification rule contains a set of symbols occurring after an "_", that rule can only be met by a PIC node whose PIC triphone context has a following phoneme contained in the set of phonemes following that underscore character. Finally, if the classification rule contains a set of phonemes, but no "_" character, then it can be met by any PIC node whose PIC triphone context has either a preceding or following phoneme which is in that set of phonemes.

Roughly speaking, at each decision tree node 158 a classification rule is selected which tends to divide the tree node's associated PIC nodes 148 into two sub-groups whose associated frame vectors 58A are most similar. If the improvement in similarity within sub-groups created by making such a subdivision at a given nodes is small, or if too few vectors would be associated with one of the resulting sub-groups, the nodes is declared an end node 160. As a result, each end node 160 has associated with it a cluster 161 of one or more PIC nodes 148 for the tree's associated phoneme which all share the same node position in PICs for that phoneme, which all have a phonetic context which share a membership and non-membership in a common set of one or more phonetic classifications associated with a common path down a decision tree 152, and which have relatively similar acoustic vectors 58A.

FIGS. 8 and 10, respectively, provide pseudo-code representations of the BuildTreeSet routine 150 used to build a set of decision trees and of the ExtendTree routine 164 called by BuildTreeSet recursively at each node of each such tree.

The BuildTreeSet routine includes steps 166 and 168 which perform steps 170 and 172 for each generalized PIC node 154 of each phoneme's generalized PIC model 156. Step 170 creates a root node 158A for each such generalized PIC node. Then step 172 calls the recursive ExtendTree routine of FIG. 10 for that root node with all of the phoneme's PIC nodes which have the same relative position in their PIC as the tree's associated generalized PIC node 154 has in its generalized PIC model 156. Once the call to the ExtendTree routine in step 172 returns after the entire tree has been built, step 174 causes the BuildTreeSet routine to return to the location in the Training Program of FIG. 4 from which it had been called.

The ExtendTree routine 164 of FIG. 10 is performed for a particular tree node 158 and for the particular set of PIC nodes associated with that tree node. It also is passed a variable, TreeSet, which indicates which of two calls to BuildTreeSet made by the Training Program of FIG. 4 has given rise to its current call.

The ExtendTree routine starts with a "for" loop 176 which performs steps 178, 180, 182, and 184 for each of the human-selected phonetic classification rule described above. Step 178 splits the group of PIC nodes 148 associated with the current tree node 158 into two sub-groups, those whose associated PICs have the phonetic context indicated by the rule and those whose associated PICs do not.

Once this is done, step 180 tests to see if the total number of vectors associated with the PIC nodes in either of the two sub-groups is less than a specific threshold value. If so, the number of frame vectors associated with the group is too small to create a statistically reliable model, and, thus, the program forgets about the classification rule that created it and skips to the iteration of the "for" loop 176 for the next classification rule, if any.

If the two sub-groups created by a classification rule each have enough frames to be reliably modeled, the "for" loop of step 182 performs two steps 186 and 188 for each of those two sub-groups. Step 186 calculates the average mean and average variance of the vectors associated with each sub-group. As stated above, to save computation each PIC node 148 has associated with it the p-dimensional mean and variance of the vectors which have been associated with it in step 144 of the Training Program. The mean and variance for each sub-group are a weighted average of the mean and variance, respectively, of each PIC node 148 associated with that sub-group, weighted by the number of vectors 58A associated with each PIC node. Once the mean and variance have been calculated for each sub-group, step 188 finds the sum, over all the vectors associated with a given sub-group, of the likelihood of each such vector occurring given the gaussian likelihood distribution defined by that sub-group's mean and variance. This sum measures how well the distribution of vectors associated with the sub-group can be modeled by a gaussian distribution, which is a rough measure of the acoustic similarity of those vectors.

Once step 188 has calculated a likelihood sum for each of the two sub-groups, step 184 stores, in association with the classification rule for which the current iteration of "for" loop 176 is being performed, a variable RuleLikelihood which equals the sum of the likelihood sums for each of the two sub-groups created by the current classification rule.

Once the iterations of loop 176 have tested each classification rule on the PIC nodes 148 associated with the current tree node 158, step 190 test to see if any RuleLikelihood has been calculated by those iterations. If not, no classification rule was able to produced two sub-groups which both had the minimum number of times required by step 180 to create a new tree node. In this case, step 192 marks the current tree node as an end node 160 and step 194 returns, ending the recursive calling of the ExtendTree routine for the current branch of the decision tree.

If, on the other hand, one or more classification rules could divide the PIC nodes of the current tree node into two sub-groups both of which had the minimum number of vectors to form a new tree node, then step 196 and the subsequent steps of the ExpandTree routine are executed for the current tree node.

Step 196 finds the classification rule which had the best RuleLikelihood value produced in all the iteration of loop 176 performed for the current tree node, and it sets BestRuleLikelihood equal to that score. Then step 198 obtains a score TreeNodeLikelihood for the current tree node which is the sum, calculated over all vectors associated with the PIC nodes of the current tree node, of the likelihood of each such vector given a gaussian probability distribution defined by the mean and variance of all such vectors. If the current node is other than the root node of a given tree, this TreeNodeLikelihood equals the Likelihood calculated in step 188 of ExtendTree for the current node's parent node based on the sub-group of PIC nodes from which the current tree node was created. If this is the case, this likelihood value can be remembered from when the current tree node was first created. Otherwise it has to be calculated by step 198.

Once TreeNodeLikelihood has been obtained, step 200 tests to see if the variable TreeSet equals SecondTreeSet.

As will be explained below, BuildTreeSet is called twice by the Training program of FIG. 4: Once to build a first tree set, FirstTreeSet, and once to build a second tree set, SecondTreeSet. The first tree set is used to divide the p-parameter frame vectors of the training data into groups for use in selecting the reduced set of q-parameters. The second tree set is used to divide the frame vectors of the training data, once they have been represented in the q parameters, into groups for the purpose of calculating new PEL models using those q parameters, and for determining which PELs that have a common ancestor node in the SecondTreeSet are to share a common set of q-dimensional basis components.

If step 200 detects that TreeSet equals SecondTreeSet, BuildTreeSet is building the second tree set, when one of its functions is to decide which PELs should share a common basis set. If this is the case, step 202 tests to see if the difference between BestRuleLikelihood and TreeNodeLikelihood is less than a SimilarAncestorNodeThreshold. If so, the distribution of vectors associated with each of the tree end nodes 160 which will descend from the current tree node will not differ significantly from the current tree node, and thus it is appropriate for all such end nodes to share basis components. In this case, step 204 marks the current tree node as a SimilarAncestorNode. A SimilarAncestorNode is a node all of whose descendant end nodes will have PEL mixture models which share a common basis set, that is, a common set of up to sixteen gaussian probability distributions.

Regardless of whether ExpandTree is being performed for the FirstTreeSet or the SecondTreeSet, step 206 tests to see if the difference between BestRuleLikelihood and TreeNodeLikelihood is greater than the value of EndNodeTreshold for the current value of TreeSet. This test is identical to that of step 200, except that the value of EndNodeThreshold is normally less than that of SimilarAncestorNodeThreshold. This is because in the second tree set the end nodes are intended to have more finely tuned distributions than the SimilarAncestorNodes from which they derive common basis components. It should be understood, however, that it is very possible that a SimilarAncestorNode will also be an end node. It should also be noted that the value of EndNodeThreshold will normally be smaller during the building of the SecondTreeSet than the FirstTreeSet, since the end nodes of the SecondTreeSet are used to determine for which PIC nodes the PEL models used in actual speech recognition should be calculated.

If the test of step 206 is met, it means the distribution of vectors associated with the current tree node can be substantially better modeled by splitting them into the two sub-groups calculated in step 178 which had the best BestRuleLikelihood, and creating a separate model for each such sub-group. If this is the case, steps 208 creates a new tree node 158 for each of these two sub-groups, and then step 210 and 212 recursively call the ExtendTree routine for each such new tree node with all of the PIC nodes associated with the new node's corresponding sub-group.

Once this is done step 214 returns from the current call to ExtendTree to the location from which it was called. Those skilled in computer programming will understand how the combination of BuildTreeSet and ExtendTree will build a tree 152 of the type shown in FIG. 9, and once this is done, the call to ExtendTree made by BuildTreeSet will return to BuildTreeSet and BuildTreeSet will return to the Training program of FIG. 4.

Returning now briefly to FIG. 4, once the call to BuildTreeSet in step 149 returns, step 216 calls the LinearDiscriminantAnalysis, or LDA, routine 218 of FIG. 11. As its name implies, this routine uses the known mathematical technique of linear discriminant analysis, or LDA. It calculates a p×q L matrix which generates a new set of q parameters from the original p parameters, where q is less than p. As stated above, q is commonly approximately one half of p. The q parameters are selected so that the clusters 161 of p-dimensional vectors 58A, of the type shown in FIG. 9, associated with each of the thousand or more end nodes of the FirstTreeSet will be best separated when the L matrix converts each of their p-dimensional vectors into a corresponding q-parameter vector and plots the resulting vectors in a q-dimensional space.

Figure 12:
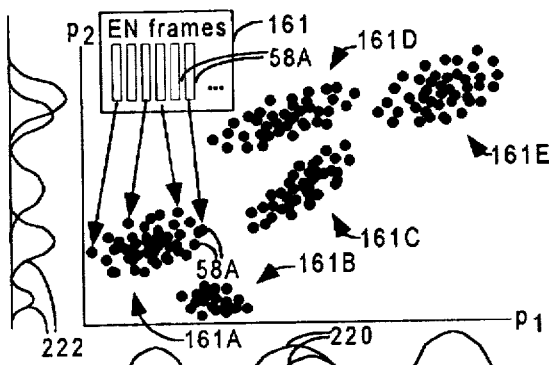
FIGS. 12–22 are schematic diagrams used to explain the operation of the LinearDiscriminantAnalysis routine of FIG. 11.
Figure 20:
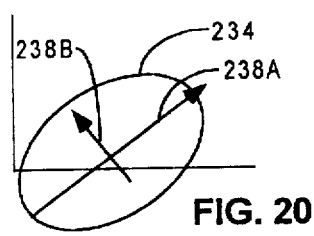
Figure 21:
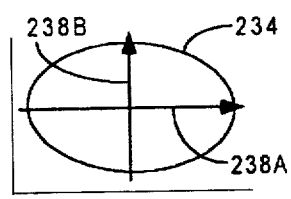
Figure 22:
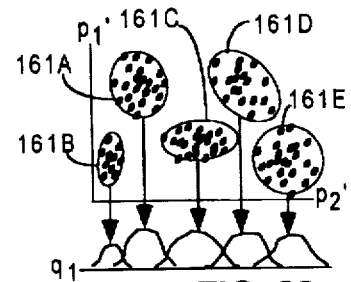

This LDA process is illustrated graphically by FIGS. 12–22. For purposes of simplification, only two of the p dimensions, $P_1$ and $P_2$, are shown in FIG. 12–22 and only one q dimension, $q_1$, is shown in FIG. 22. FIG. 12 shows a plurality of the end node clusters 161A–161E of p-dimensional vectors 58A plotted in the p-dimensional space. In FIG. 12, these clusters are fairly well separated in the spaced defined by the combination of the two dimensions $P_1$ and $P_2$, but they are not well separated along either of those two individual dimensions. This is indicated by the curves 220 and 222 which indicate the distribution of such clusters when projected into the $P_1$ and $P_2$ dimensions, respectively. The goal of the LDA routine is to rotate and scale the dimensions of the p-dimensional space to create a new space in which the end node clusters 161 can be well separated in a projection of that rotated and scaled p-dimensional space onto a q-dimensional space, where q is less than p. This is indicated in FIG. 22 in which the clusters 161A-E represented in the two dimensions $P_1'$ and $P_2'$ of such a rotated and scaled p-dimensional space are well separated when projected onto one dimension, $q_1$, in a q-dimensional space.

As shown in FIG. 11, the LDA routine 218 starts with a step 220 which calculates the WithinGroupsCovarianceMatrix W for the vectors grouped in the clusters 161 associated with each end node of the first set of trees. The W matrix is the weighted average of the all the covariance matrices calculated for each cluster 161, weighted by the number of vectors associated with each such cluster.

To understand the WithinGroupsCovarianceMatrix W it is important to first understand what the covariance matrix of a single group of n vectors represents. For a group of n p-dimensional vectors, each vector $V_i$ can be represented as an ordered set of parameter values $V_i^k$ as follows:

$$V_i = (V_i^1, V_i^2, \ldots V_i^p) \quad \text{Eq. 1}$$

where the subscript i identifies the individual vector and the superscript where k represents the individual parameter.

Using this notation, the covariance matrix S for the group can be represented as:

$$S^{rc} = \frac{1}{n-1} \sum_{i=1}^{n} (V_i^r - \overline{V^r})(V_i^c - \overline{V^c}) \quad \text{Eq. 2}$$

Where S is a square matrix having one row and one column for each of the p parameters and having an element $S^{rc}$ at the intersection of each row r and column as follows:

$$\begin{matrix} S^{11} & S^{12} & \ldots & S^{1p} \\ S^{21} & S^{22} & \ldots & S^{2p} \\ \cdot & \cdot & & \cdot \\ \cdot & \cdot & & \cdot \\ \cdot & \cdot & & \cdot \\ S^{p1} & S^{p2} & \ldots & S^{pp} \end{matrix} \quad \text{Eq. 3}$$

Figure 13:
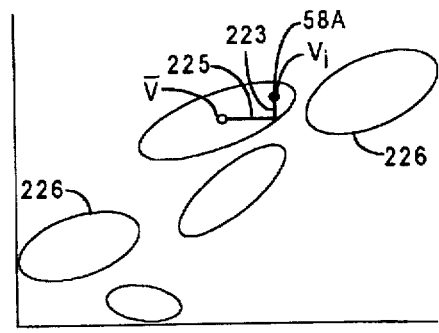

As indicated by Eq. 2, each element $S^{rc}$ is equal to the average, over all points in the distribution, of the product of each point's distance from the mean $\overline{V}$ of the distribution in the r dimension times its distance from that mean along the c dimension. In FIG. 13 two such distances 223 and 225 are shown for a vector $V_i$ in the first and second p dimensions, $P_1$ and $P_2$.

For the diagonally located elements of the S matrix shown in Eq. 3, in which r and c represent the same dimension, the average $S^{rc}$ is the variance of the distribution in that dimension, that is, it is an indication of the spread of the distribution in that dimension. For the off-diagonal elements whose row and column represent different dimensions, the average $S^{rc}$ represents the covariance between those two dimensions, that is, the extent to which the values of the distribution's vectors tend to vary together in those two different dimensions. The covariance between two dimensions is a measure of the direction which is angltribution tends to extend in a direction which is angled relative to each of those two dimensions. The exact angle of the average direction of extension of the distribution relative to those two dimensions is a function of the covariance between those two directions and the variance in each of those directions.

Thus, it can be seen that the covariance matrix S of each cluster 161 of p-dimensional vectors 58A is an indication of the size, spread, and direction of extension of the distribution of that cluster's vectors in multi-dimensional space. In FIG. 13, the features of size, spread, and direction of extension represented by the covariance matrix S for each of the clusters 161 in FIG. 12 are represented in two dimensions by an ellipse 226.

As stated above, the within-groups covariance matrix W is the weighted average of all the covariance matrices S of all the end node dusters 161, weighted by the number of vectors in each such cluster. This is calculated using the following formula:

$$W^{rc} = \frac{1}{N-g} \sum_{j=1}^{g} (n_j - 1) S_j^{rc} \quad \text{Eq. 4}$$

where the index j varies from 1 to g, g is the total number of clusters 161, W is a p×p square matrix having one element corresponding to each of the elements in the S matrix shown in Eq. 3, and $S_j^{rc}$ is the element in the rth row and cth column of the covariance matrix S for the jth cluster, $n_j$ is the number of vectors in the jth cluster, N is the total number of vectors in all clusters, and $W^{rc}$ is the element in the rth row and cth column of the within-groups covariance matrix. The within-groups covariance matrix W represents the average shape and size of all distributions represented by the S matrices.

Figure 14:
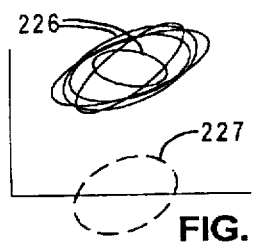
Figure 15:
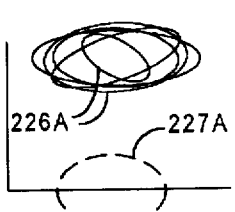

This is represented by the ellipse 227 in FIG. 14 which is the average of all the superimposed ellipses 226 from FIG. 13.

Figure 16:
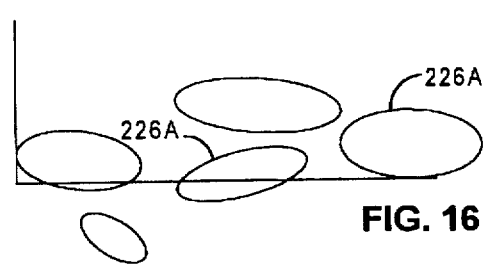
Figure 17:
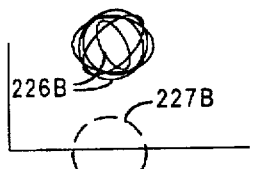

As shown in FIG. 11, once the W matrix has been calculated, step 228 finds a p×p matrix L1 which rotates and scales the axis of the space defined by the original p parameters to create a space in which W becomes an identity matrix, that is a matrix in which all the off-diagonal, or covariance, elements are zero, and all the diagonal, or variance, elements equal one. According to well known mathematical techniques this process can be performed by first rotating the axes of the p-dimensional space so they align with the direction represented by the covariances of the average distribution 227 represented by the W matrix. This rotation is represented by the change between FIG. 14 and FIG. 15. Once the space has been rotated in this manner, all the covariances, or off-diagonal elements, of the rotated W matrix 227A will become zero because the distributions will be extended only along the directions of the new rotated dimensions, and not at an angle toward any of those dimensions. The effect of this rotation upon the individual cluster distributions 226 is shown in FIG. 16, where the rotated distributions are numbered 226A.

Figure 18:
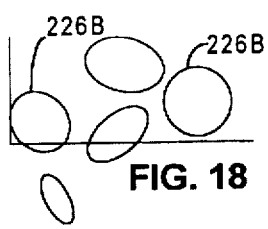

Once the W matrix has been diagonalized, the various dimensions of the new p-dimensional space defined by the diagonal matrix are stretched or compressed so that each of the W matrix's diagonal elements is set equal to one. This has the effect of converting the average distribution shape of the original W matrix, as represented in FIG. 14, into a shape which is circular in the new p-dimensional space, as indicated FIG. 18 shows the affect this scaling change has in the shape of the individual cluster distributions 226 by numeral 227B in FIG. 17.

Figure 19:
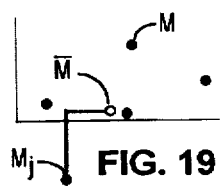

Once step 228 has calculated a matrix L1 which rotates and scales the original p-dimension so at to convert the W matrix into an identity matrix, step 230 of FIG. 11 finds the mean $M_j$ of the vectors associated with each end node cluster 161 identified by the j index in the rotated and scaled space defined by L1, and the mean $\overline{M}$ of all such vectors in that space. In FIG. 19 the values of $M_j$ are represented by solid dots and the value of $\overline{M}$ is represented by a hollow dot.

Once values of the Ms and of $\overline{M}$ have been calculated, step 232 creates a between-group covariance matrix B, using the formula $$B^{rc} = \frac{1}{g-1} \sum_{j=1}^{g} (M_j^r - \overline{M^r})(M_j^c - \overline{M^c}) \quad \text{Eq. 5}$$

where, as in the W matrix, j is the index indicating the individual cluster, there are g clusters, $M_j^k - \overline{M^k}$ is the distance between the mean of the jth cluster and the mean of all clusters in the kth dimension, B is a square matrix having the same p×p dimensionality as the S matrix, and $B^{rc}$ is the element of the B matrix at row r and column c.

The between-group covariance matrix B, represents the size and shape of the distribution of cluster centers, or means $M_j$. In FIG. 20 this distribution shape is represented by the ellipse 234. Once the matrix B has been calculated, step 236 of FIG. 11 performs the well known function of solving for the p eigenvectors and corresponding p eigenvalues of the p-dimensional B matrix. Each eigenvector, such as the vectors 238A and 238B of FIG. 20, correspond to a direction in the L1 space along which the distribution represented by the B matrix is aligned. The eigenvalue for each eigenvector represents the degree of spread of the distribution along that eigenvector's direction. From the p eigenvectors derived from for the p-dimensional B matrix, step 238 selects the q which have the largest eigenvalues, that is, the q directions in which the distribution of cluster means $M_j$ are spread out the most. Then step 240 finds an matrix L2 which rotates and projects the L1 space into a q dimensional space in which the direction represented by each of the q eigenvectors found in step 236 is parallel to one of the q axes. This is represented in FIG. 21 in which the distribution 234 is rotated so that its largest eigenvector 238A is parallel to the $q_1$ axis and then its two dimensions are projected onto the single $q_1$ dimension. Once the L2 matrix has been computed, step 242 calculates the L matrix, which it is the purpose of the LDA routine to calculate, by multiplying the L1 matrix by the L2 matrix. When this is done, step 244 of the LDA routine returns to the Training routine.

In summary, the LDA routine of FIG. 11 seeks to find q dimensions in which the ratio of the spread of cluster centers to the average spread within clusters is maximized. It does this by seeking an L1 transform which will make the average spread of cluster distributions the same in all directions, as shown in FIG. 16. Once the within-cluster spread has been made direction invariant, the transformation which maximizes the ratio of between clusters spread to within cluster spread can be found merely by finding the q directions in the L1 space in which the spread of cluster centers is largest. As indicated in FIG. 22, in which the points of the clusters 161A-E are plotted in the one dimension $q_1$ of the q-dimensional space, the separation along the single $q_1$ dimension is much better than along any one of the two p dimensions shown in FIG. 12.

Figure 23:
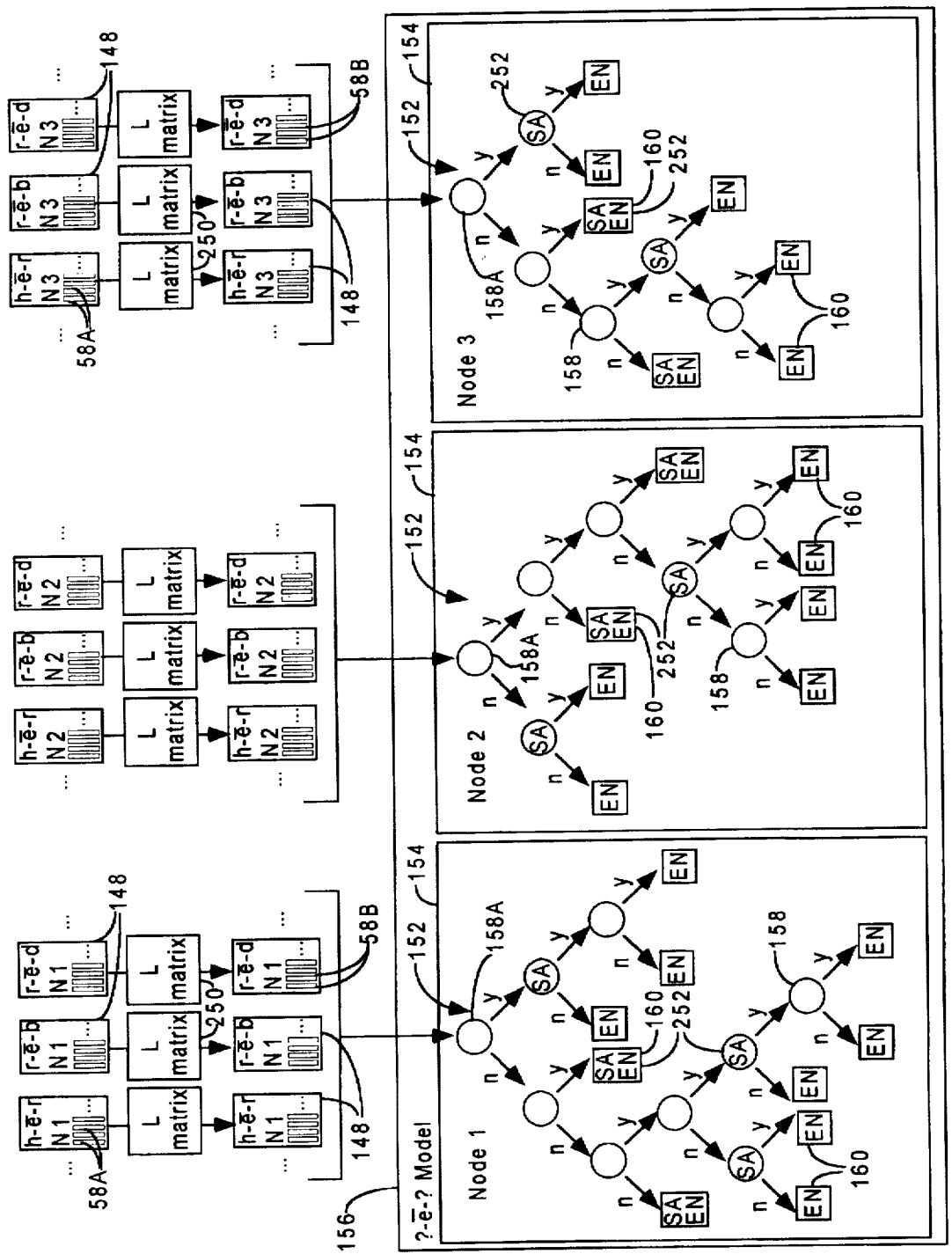
FIG. 23 is a schematic representation of the second set of decision trees built for each phoneme by the second call to the BuildTreeSet routine of FIG. 8 made by the Training program of FIG. 4.

Returning to FIG. 4 briefly, once the LDA routine called in step 216 has calculated the L matrix and returned, step 244 performs a step 246 for each PIC node 148, which uses that L matrix to convert each vector 58A associated with that PIC node by step 138, 142, and 144 of FIG. 4 into a corresponding vector 58B, shown in FIG. 23, having the q parameters selected by the LDA. Although not shown in FIG. 4, step 246 also calculates a q-dimensional mean and variance for all the q-dimensional vectors associated with each such PIC node.

Next step 248 calls the BuildTreeSet routine 150 of FIG. 8, described above, to build the SecondTreeSet. This second call to BuildTreeSet uses the same PIC nodes, associated with the same time frames in the training speech, and the same set of human selected phonetic context classification rules as the first call to BuildTreeSet in step 149. But the second call to BuildTreeSet is different than the first because the vectors associated with each PIC node are represented using the q-parameters rather than the original p parameters, and because it sets TreeSet equal to SecondTreeSet. Setting TreeSet to SecondTreeSet causes steps 200, 202, and 204 of the ExtendTree routine of FIG. 10 to look for, and label, SimilarAncestorNodes when building the second tree, and it causes step 206 of ExtendTree to used a different, usually finer EndNodeThreshold in determining whether to subdivide its current tree node into a two new child tree nodes. As a result, the SecondTreeSet created in step 248 often has a different and slightly finer grouping of PIC nodes than the FirstTreeSet.

The creation of this second set of trees for the generalized PIC model 156 of the long "e" phoneme by steps 244, 246, and 248 of FIG. 4 is illustrated in FIG. 23. In this figure the set of original p-parameter vectors 58A associated with the PIC nodes 148 are shown being converted by means of the L matrix 250 into a corresponding set of q-dimensional vectors 58B associated, respectively, with those PIC nodes. The PIC nodes, with their new vectors, associated with a given generalized PIC node 154 are shown being fed into the root 158A of the decision tree 152 formed for that generalized PIC node. The decision tree that results for each generalized PIC node has not only end nodes 160, which are similar, but not necessarily identical to those in the first tree built for that generalized PIC node, but also SimilarAncestorNodes 252, described above with regard to the ExtendTree routine of FIG. 10.

Once the second set of trees has been built by step 248 of the Training program of FIG. 4, the loop of step 254 of that routine performs steps 256 and 258 for each SimilarAncestorNode 252, to calculate the basis set which is to be shared by the mixture models in all the PEL models which are descended from each such SimilarAncestorNode. Step 256 calls the LBGClustering routine 260 of FIG. 24 to cluster the vectors associated with the SimilarAncestorNode into up to sixteen clusters and then it creates a gaussian basis component corresponding to each such cluster. Step 258 calls the EMRelaxation routine 259 of FIG. 34 to modify the initial basis components derived by step 256 for the SimilarAncestorNode to better model the distribution of vectors associated with that node and to calculate an initial mixture model for the SimilarAncestorNode.

The LBGClustering routine 260 uses the previously known Linde-Buzo-Grey method of clustering points in a space. FIG. 24 provides a pseudo-code description of the major steps of this routine and FIGS. 25-33 provide a simplified graphic description of what these steps do.

Figure 25:
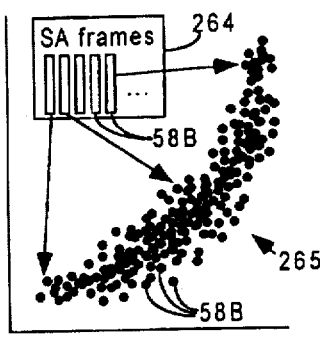
FIGS. 25-33 are schematic diagrams used to explain the operation of the LBGClustering routine of FIG. 24.
Figure 26:
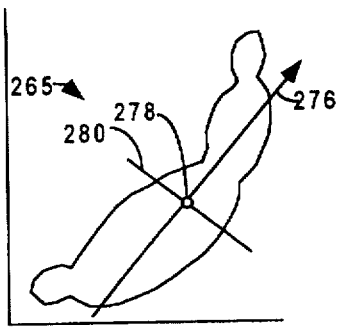

The first step of the LBGClustering routine, step 262 places all the q-dimensional points represented by the all vectors 58B associated with the SimilarAncestorNode for which it has been called into one big cluster 265. This is indicated in FIG. 25 in which the set 264 of frames 58B associated with a given SimilarAncestorNode are placed in one initial cluster 265. Next step 266 repeatedly performs a loop comprised of two sub-loops 268 and 270, which attempts to divide each of the clusters of vectors associated with the SimilarAncestorNode into sub-clusters, until either sixteen clusters have been created from the points associated with the SimilarAncestorNode or until the sum of the variances for each cluster is less than a preset threshold value StopLBGThreshold.

The sub-loop 268 performs two steps 272 and 274 for each cluster which has been created by a previous iteration of loop 266. Step 272 finds the direction in which the points of the cluster have the greatest variance, as is indicated by the direction 276 in FIG. 26, and then step 274 splits the cluster in two at the cluster's mean 278 in that direction, as is indicated by the line 280 in FIG. 26.

Once steps 272 and 274 have been performed for each cluster which existed prior to the current iteration of loop 266, the loop 270 is performed a fixed number of times. It should be appreciated that in other embodiments of the invention this loop could be repeated until the decrease in variance in each cluster produced with each iteration is less than a specified amount. The loop 270 is comprised of two steps 282 and 284. Step 282 places each vector in all of the clusters currently existing for the SimilarAncestorNode into that one of those clusters whose mean it is closest to. Then if, as a result of step 282, any cluster has had vectors added to, or removed from, it, step 284 recalculates that cluster's mean based on the vectors that currently belong to it.

Figure 27:
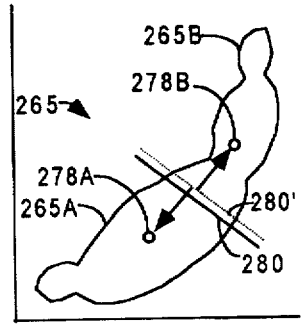
Figure 28:
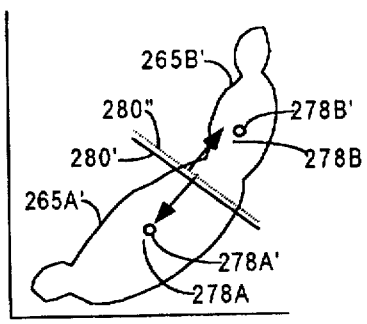
Figure 29:
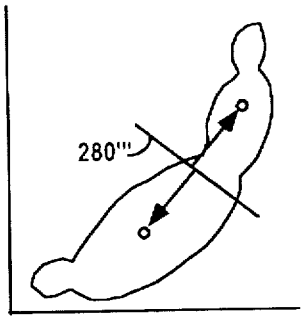

As indicated in FIG. 27, when a cluster 265 is first divided at its mean in the direction of its greatest variance, the resulting boundary 280 will often not be equal distance between the two means 278A and 278B of the resulting two new clusters 265A and 265B, respectively. As a results, when step 282 places all the points in the clusters to which they are closest, the boundary between two cluster moves to line 280' which perpendicularly bisects the line between their two means. But each time the boundary between clusters is changed, such as from 280 to 280' in FIG. 27, the means of the clusters change, such as from 278A and 278B in FIG. 27 to 278A' and 278B' in FIG. 28. Then when another iteration of steps 282 and 284 is performed, this will cause the boundary 280' to be moved to the line 280" which bisects the distance between these new means, as shown in FIG. 28.

Figure 30:
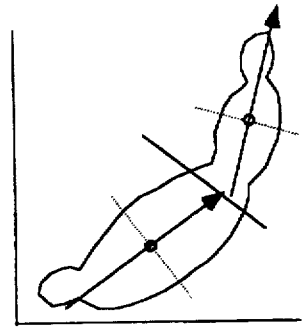
Figure 31:
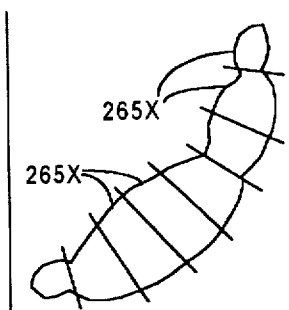
Figure 32:
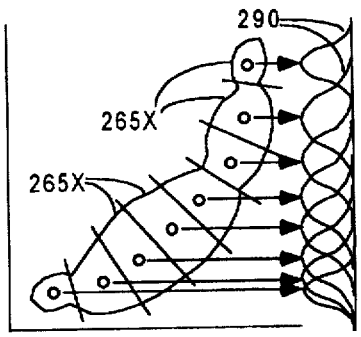
Figure 33:
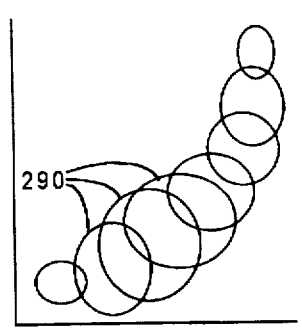

As FIG. 30 shows, then next iterations of loop 266 then divides each of the clusters created in the prior iteration in half using the same method. This process is repeated until the terminating condition of step 266 is met, at which point the distribution of vectors associated with the SimilarAncestorNode will be broken upon into a relatively fine collection of clusters 265X, as shown in FIG. 31. Once this is done, steps 286 and 288 of the LBGClustering routine create a gaussian distribution for each cluster 265X having a mean and variance corresponding to those of the distribution of vectors 58A associated with that cluster. This is indicated in FIG. 32 where the distribution 290 associated with each cluster 265X is shown projected in one dimension, and in FIG. 33 where each such distribution is indicated by the ellipse whose center is the mean of that distribution and whose extend in each dimension shown is defined in proportion to that distribution's variance in that dimension. This collection of gaussian distributions 290 comprises the initial basis set for the SimilarAncestorNode.

Once this initial basis set has been calculated, step 292 of the LBGClustering routine returns to step 256 of the Training routine of FIG. 4 which called it. When this happens in the iteration of loop 254 of the Training routine being performed for a given SimilarAncestorNode, step 258 calls the EMRelaxation routine to improve the initial basis produced by LBGClustering for the SimilarAncestorNode and to calculate a single initial mixture model to be used for all of the end nodes descending from that SimilarAncestorNode.

FIG. 34 is a pseudo-code representation of the EMRelaxation routine 259. The initials "EM" stand for "Expectation-Maximization", a known mathematical technique, upon which this routine is based. FIG. 35 is a graphical representation of this routine. The EMRelaxation routine is comprised of a loop 296 which performs a sub-loop 298 for each of one or more iterations. In each iteration of loop 296, the sub-loop 298 performs steps 300, 302, and 304 for each basis component 290 in the current SimilarAncestorNode's basis set. Step 300 initializes three accumulator variables associated with each basis component to zero. These three variables, WeightSum, WeightedVectorSum, and WeightedVarianceSum, will be used to define each basis component.

WeightSum is a probabilistically weighted count of all the vectors which have contributed values to the component, weighted by the likelihood of each such vector given the gaussian distribution represented by the basis component. The ratio produced by dividing a given basis component's WeightSum by the total of the WeightSums for all of the basis components in its basis set reflects the relative importance of the given individual basis component in representing the SimilarAncestorNode's entire vector distribution, and this ratio is used as the weight by which the given basis component is multiplied in the mixture model which is used to represent the SimilarAncestorNode.

WeightedVectorSum is the sum of probabilistically weighted q-dimensional vector values which have been associated with the basis components. Once WeightSum and WeightedVectorSum have been properly trained, the mean of the basis component will be treated as the probabilistically weighted average of all its associated vectors. This is represented by WeightedVectorSum divided by WeightSum.

Similarly WeightedVarianceSum is the sum of probabilistically weighted q-dimensional variance values which have been associated with the basis component. The variance of the basis component will equal WeightedVarianceSum divided by WeightSum.

Once these accumulator values have been initialized to zero for the basis component for which the current iteration of loop 298 is being performed, step 302 performs a loop comprised of steps 306, 308, and 310 for each q-dimensional frame vectors 58B associated with the SimilarAncestorNode.

Step 306 computes and saves Prob, a value representing the likelihood of the vector given the basis component's gaussian probability distribution. This is represented in FIG. 35 in which the Prob for the current point 58B against the likelihood distribution of the current basis component 290 is represented as the height 312 of the component 290 at the value of the point 58B. It should be understood that the total value of Prob is calculated by summing the heights 312 produced for the value of vector 58B in each of the q dimensions against the likelihood distribution for that dimension to calculate the total likelihood of the vector against the basis component's q-dimensional likelihood distribution.

Once Prob is calculated for the vector, step 308 adds Prob to the WeightSum, and step 310 adds the product of the vector's q-dimensional value times Prob to the q-dimensional WeightedVectorSum. Once steps 306 and 308 have been performed for the basis component for each vector of the SimilarAncestorNode, an initial mean, defined as WeightedVectorSum divided by WeightSum can be defined for the component. Once this is done, step 304 causes step 316 to add the product of the variance of each vector, calculated as the square of the difference between each vector's q-dimensional value and the q-dimensional mean just described, to WeightedVarianceSum.

Once the loop 298 has been performed for each vector of each basis component, each basis component will have a new gaussian distribution 320, shown in FIG. 35, defined by its new mean, WeightedVectorSum/Weight Sum, and its new variance, WeightedVarianceSum/WeightSum, and the distribution of all the SimilarAncestorNode's vectors will be modeled by the likelihood distribution 318 defined by the mixture model created by summing the products of each basis component 320 by the ratio of its individual WeightSum divided by the sum of all WeightSums for the basis set.

If desired, the loop 296 can be repeated multiple times, as indicated in FIG. 35, with each step weighting the contribution of each vector's values and variance against each basis component as a function of the likelihood of that vector given the q-dimensional gaussian likelihood distribution calculated for that basis component in the prior iteration of the loop 296. As such successive iterations are performed, the mean, variation, and weight of each of the basis components will be varied until the basis set's associated mixture model comprises a relatively optimal representation of the similar ancestor node's vector distribution, given the number of components contained in the basis set.

Once the iterations of loop 296 have been performed, step 322 returns from the EMRelaxation routine to the iteration of loop 254 of the Training program of FIG. 4 which called it.

Once loop 254 of the Training program has developed a basis set and mixture model for each SimilarAncestorNode in the SecondTreeSet, step 324 of the Training program calls the InitialBWBatchTraining routine 326 of FIG. 36 to determine the individual weighting to be used in the mixture models used for the PEL model of each end node in the SecondTreeSet. "BW" refers to Baum-Welch, the name of a known mathematical technique for probabilistically training models.

As is indicated in FIG. 36, the function of the InitialBWBatchTraining routine is to set up the first call to the BWBatchTraining routine 336 of FIG. 37, by creating an initial set of PEL mixture models for the second tree set, and then to call BWBatchTraining for that set.

Steps 328 and 330 of the InitialBWBatchTraining routine create an initial PEL mixture model for each end node of the second set of trees. The initial PEL model for each end node uses the basis set calculated for the end node's associated SimilarAncestorNode in the EMRelaxation routine of FIG. 34. Each such PEL model also has a WeightSum, WeightedVectorSum, and WeightedVarianceSum variable associated with each of its basis components, each of which has its initial value set to the value of the corresponding variable in the mixture model calculated for the PEL's SimilarAncestorNode in the EMRelaxation routine. This causes each PEL to start out with the same mixture model as its SimilarAncestorNode.

Once each end node of the second set of trees has been given a PEL model, step 332 of the InitialBWBatchTraining routine calls the BWBatchTraining routine 336 of FIG. 37.

The BWBatchTraining routine 336 called by the InitialBWBatchTraining routine can be used at any time to update a second tree set's set of PEL mixture models. When it is first called by the InitialBWBatchTraining routine, all the PEL models which share a common SimilarAncestorNode will start out with the same mixture model.

Figure 38:
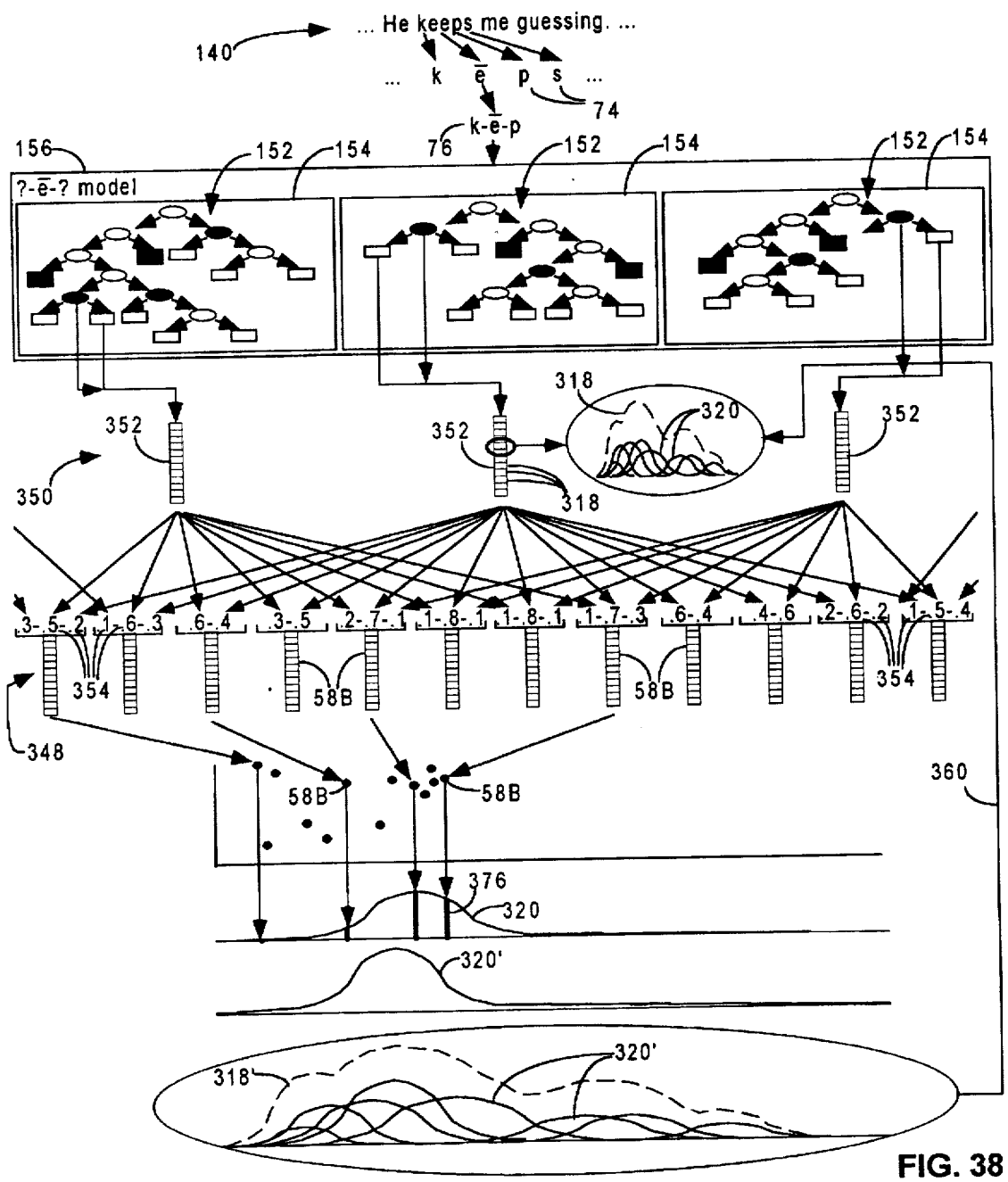
FIG. 38 is a schematic diagram used to explain the operation of the InitialBWBatchTraining routine of FIG. 36.

The BWBatchTraining routine consists of a "for" loop 338 which is performed one or more times, with the number of iterations being a function of the accuracy of the PEL models desired. This loop performs steps 340 and 342 in each iteration. As illustrated in FIG. 38, step 340 probabilistically time aligns the training data's sequence 348 of frame vectors 58B against the sequence 350 of PEL mixture models 352 of the PICs 76 corresponding to the phonemes 74 of the training script 140. This produces a PELProb 354 for each probabilistic time alignment of a vector against a PEL, indicating the probability of that vector corresponding to that PEL. Once this has been done for a given amount of training speech, and in the InitialBWBatchTraining it is done for a large amount of such speech over many speakers, then step 344 calls the BWPELTraining routine 356 of FIG. 39 for the PEL associated with each end node in the second tree set with a list, for each PEL, of all the vectors which have been probabilistically time aligned against it and the PELProb for each such probabilistic time alignment.

As indicated in FIG. 39, the BWPELTraining routine is comprised of a loop 358 which performs a sub-loop 360 for each basis component of the mixture model 318 of the PEL 352 for which the routine has been called. Sub-loop 360 causes steps 362, 364, 366, 368, 370, and 372 to be performed for the basis component 320 for each vector 58B which has been time aligned against the PEL. Step 362 sets ComponentProp 376 equal to the likelihood of the vector given the basis component's likelihood distribution. ComponentProb is indicated in FIG. 38, as the height of the likelihood curve at the location of the vector 58B in a given dimension. As indicated by the discussion of FIG. 35, the actual ComponentProp is the sum of a corresponding likelihood in each of the vector's q-dimensions. Once this is done, step 364 sets a variable Prob equal to the sum of PELProb plus ComponentProb to represent the combined probability that the vector corresponds to the sound of the PEL and that it also corresponds to the particular basis component in that PEL. Step 366 then adds Prob to the component's current value of Weight Sum in the PEL's mixture model. This WeightSum, when divided by the sum of all the WeightSums for all of the PEL's basis components, will comprise the weight factor for the basis component in the PEL's mixture model. Steps 368 then adds Prob to value of WeightSum for the PEL's SimilarAncestorNode to calculate the weighting factor which will be used as the denominator in determining the mean and variance for the basis component in the basis set which is to be shared by all PELs sharing the given PEL's SimilarAncestorNode. Then step 370 adds each of the q-parameter values of the vector 58B, multiplied by Prob, to the q-parameter values of the SimilarAncestorNode's WeightedVectorSum. Similarly step 372 adds the square of the q-dimensional value of the distance between the Vector and the approximate probabilistic mean of the distribution represented by the basis component times Prob to the SimilarAncestorNode's value of WeightedVarianceSum for the component.

Once the loop 360 has been completed for each vector in the VectorList, step 374 returns from the BWPelTraining routine to the step of the routine which called BWPelTraining, which in the case being discussed in step 344 of loop 338 in FIG. 37.

After BWPELTraining has been called for each PEL, the values of WeightSum, WeightedVectorSum, and WeightedVarianceSum will have been probabilistically updated for each basis component of each SimilarAncestorNode. The new q-dimensional mean of each such component will equal WeightedVectorSum/WeightSum for that component and the new q-dimensional variance will equal WeightedVarianceSum/WeightSum for that component, causing the basis component to have a new center and spread, as is indicated in FIG. 38 at 320'. For each PEL the value of the PEL's WeightSum for each component divided by the sum of the PEL's WeightSums for all its basis components will equal the weighting factor which determines the height of each basis component 320' in the updated mixture model 318', shown in one dimension in FIG. 38, calculated for each PEL by each pass of the loop 338 of FIG. 37.

If the loop 338 is repeated, the mixture model 318 calculated in one pass of the loop is used in the PEL models 352 used in the probabilistic time alignment against the training data 348 used in the next pass, as is indicated by the arrow 360 shown in FIG. 38. As the PEL models are improved in each pass of the Baum-Welch training, the resulting probabilistic time alignment of the training data against those models also improves, making the adjustment of the mixture models even more accurate. This iteration can be repeated until the improvement gained by each additional iteration becomes too small to warrant a further iteration.

It can be seen that after the first pass though the Baum-Welch training the weight used in the individual PEL models which share a given SimilarAncestorNode will begin to vary from each other, based on the different set of vectors probabilistically time aligned against each. It can also be seen that the basis components shared by all the PELs of a given SimilarAncestorNode will have their individual means and variances vary as a function of the vectors time aligned against all of those PELs.

Because the present invention causes the PELs which share a given SimilarAncestorNode's basis set to be related through the phonetic classification rules used to build the second tree set, the sharing of such basis components between such PELs makes sense. This is particularly valuable if training is performed on new training data other than that used to build the second tree set. It is valuable because it is very possible for the distributions of vectors associated with two PELs to appear similar based on one set of training data which are not likely to appear similar once more, or different training data is used. However, this likelihood is significantly reduced if those PELs represent related speech sounds. Causing PELs which have similar phonetic classification to share basis components, as the present invention does, also has the advantage of making adaptation more rapid, by allowing training data which is derived for one PEL to update the basis component for all the related PELs sharing the same SimilarAncestorNode.

Once the one or more iterations of loop 338 are complete, step 346 of FIG. 37 returns from the BWBatchTraining routine to step of the routine which called it. In the case being discussed this is step 332 of the InitialBWBatchTraining routine of FIG. 36. When such a return is made, step 334 of FIG. 36 then returns from InitialBWBatchTraining to the step which called it.

Once the call to InitialBWBatchTraining in step 324 in the Training program of FIG. 4 is complete, step 380 saves a compacted representation of the second tree set for use in the Recognition routine described below with regard to FIG. 41. Step 382 saves the basis set associated with each SimilarAncestorNode in that second tree set, including the WeightSum, WeightedVectorSum, and WeightedVarianceSum for each component in that set. Step 384 then saves the mixture model associated with each PEL, including a pointer to the SimilarAncestorNode whose basis set it shares, and the PEL's WeightSum for each component of that basis set. Finally step 386 saves the L matrix calculated by the linear discriminant analysis for use in subsequent recognition against and training of the PEL models.

Once this is done the Training program of FIG. 4 is complete and, thus, step 388 returns.

Figure 42:
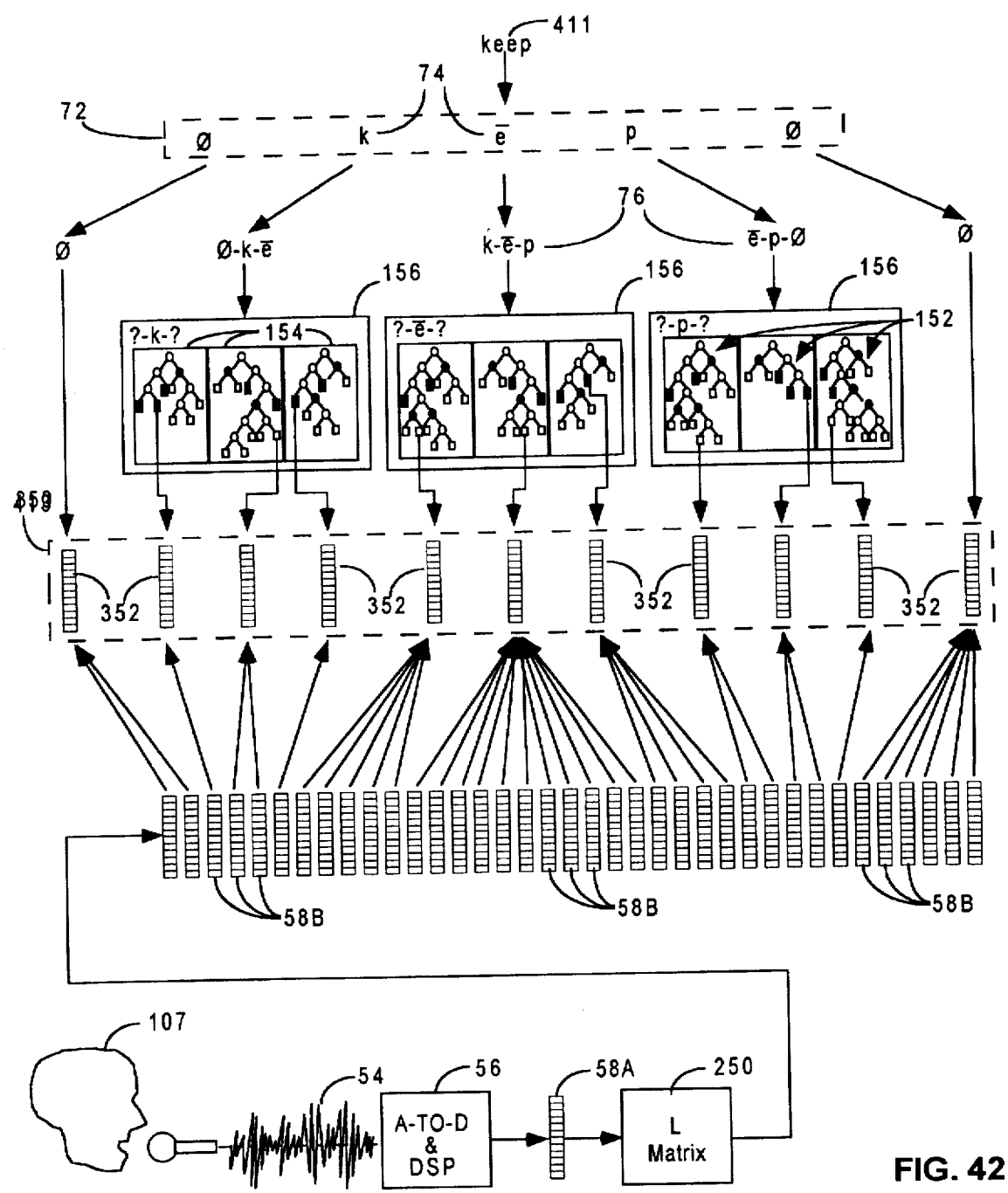
FIG. 42 is a schematic diagram used to represent the speech recognition process performed by the combination of the FastDemon and Recognition routines of FIGS. 40 and 41, respectively.

FIGS. 40, 41, and 42 are used to explain how the invention can be used in actual speech recognition. In these figures, a simplified description of a discrete word recognizer is given, but those skilled in the arts should understand that the present invention can be used in a similar manner in continuous speech recognition.

FIG. 40 represents a FastDemon routine 388 which is called many times a second to process speech signals as they are spoken by a user 107 of a speech recognition system shown in FIG. 42. It includes a step 390 which uses analog to digital conversion and digital signal processing of the type discussed above to convert the analog speech waveform 54 into a vector 58A using the original p parameters used in the vectors of the first tree set for each frame period. Then a step 392 uses the L matrix 250 described above to calculate a q-dimensional vector 58B, using the q-parameters calculated using linear discriminant analysis. It should be understood that in many embodiments step 390 and 392 will be performed by a separate DSP chip rather than by the recognizer's CPU. Step 394 then places the most recently calculated q-dimensional vector 58B into a frame buffer (which is not shown in FIG. 42).

Step 396 detects if the sound associated with a given point in the frame sequence appears to be the start of a new utterance to be recognized. It does this by a method similar to that described in U.S. Pat. No. 4,829,578, issued to Jed M. Roberts on May 9, 1989 and entitled "Speech Detection And Recognition Apparatus For Use With Background Noise Of Varying Levels", which is hereby incorporated by reference herein. Basically this method detects an utterance when the amplitude of the audio signal exceeds a moving average threshold value, based on the signal's amplitude during periods which the method has previously determined do not include utterances, and based on the variability of the amplitude during such periods. The portion of the audio signal associated with an utterance starts a brief period before the amplitude first exceeds that threshold, since the spoken sound of a discrete utterance starts with, and builds up amplitude from, silence. If step 396 detects an utterance it calls the Recognition routine 398.

The Recognize routine 398 of FIG. 41 is called for a given utterance detected by step 396. The utterance is comprised of a sequence of frames 58B which the Recognition routine should perform recognition against. When the Recognition routine is called, step 402 scores the start of the sequence of frames representing the utterance against a prefilter model for each word in the vocabulary. This task is simplified by the fact that words with similar initial sounds share the same prefilter model, greatly reducing computation.

Once this is done step 404 limits the active word models to a given number of candidates with the best scoring prefilter models. Step 406 then performs a loop comprised of steps 408 and 410 for each active word model candidate, such as the word "keep" 411 shown in the example of FIG. 42. Step 408 creates an initially empty acoustic model 413 for the word in RAM memory. Then step 410 performs a loop, comprised of steps 412 and 414, for each phoneme 74 in the word's phonetic spelling 72. Step 412 defines the PIC 76 which corresponds to each such phoneme given its context in that spelling. Then, for the decision tree associated with each of the generalized PIC nodes 154 in the generalized PIC model 156 for the PIC's phoneme, steps 414 and 416 add a PEL 352 to the word's acoustic model 413 corresponding to the end node in that decision tree with which the PIC is associated. This association, or mapping, from a PIC to three PELs is done by having the PIC traverse each of its three associated decision tree, based on how its phonetic context compares with the various classification rules associated with the tree's nodes.

The decision trees are used to map PICs into PELs at run time, because even though traversing the decision tree requires more computation than using a look-up table which maps PICs to PELs, the decision tree takes much less memory to store, reducing by several megabytes the amount of memory required to run a large vocabulary recognizer.

In other embodiments of the invention, where speed is more important than memory storage, a look-up table is used to perform the mapping between PIC's and PELs. In a dictation system where the number of allowed PICs is limited, such as a discrete word recognizer with a fixed vocabulary, such a table could be created by passing each PIC node of each allowed PIC through the PIC node's corresponding tree in the second tree set to find out what PEL should be associated with it, and then storing that PIC to PEL association in the look up table. Once this has been done, the second tree set could be discarded and the look-up table could be used by the recognizer to perform PIC to PEL mapping. In a continuous speech recognizer in which the user can add words, all possible PICs should be passed through the second tree set to produce a look-up table having entries for all possible PICs.

Once the loop 406 has created an acoustic word model for each active word candidate, step 418 performs a loop 420 for each successive frame 58B of the utterance to be recognized until the scoring of word model candidates is complete.

Loop 420, in turn, performs steps 422 and 426 for each active word model candidate. Step 422 uses the likelihood of the frame given the probability model of the PEL of the word's acoustic model against which that frame is time aligned, as indicated in FIG. 42, to update the relative likelihood score of that active word. Step 426 makes inactive any words whose score is worse than a given threshold.

After the loop 418 has been completed, the words with the best scores will be those whose acoustic model 413 have the most likely time alignment against the frame vectors of the utterance to be recognized, in a manner similar to that described above with regard to FIG. 1. Then step 428 places the best scoring words, and their scores, in a result buffer. Next step 430 erases all the acoustic word models in RAM, to save memory, and step 432 returns with a pointer to the results buffer which contains the best scoring words. Normally the best scoring word in that buffer will be treated as the recognized word by the program which is using the recognizer, such as by inserting it into a body of text being dictated, as illustrated on the video monitor 104 shown in FIG. 3.

FIG. 43 represents an AdaptiveTraining routine 440 which is preferably used by the same program that uses the Recognizer routine of FIG. 41. This program can be called for every word whose recognition the system has good reason to believe is correct. This can be when the user is being careful to correct all mis-recognized words, or it can be when the user intervenes to correct a mis-recognized word to represent the correct word. In either case, when the AdaptiveTraining routine is called for a recognized word, a loop 442 performs steps 444 and 446 for each PEL whose model occurs one or more times in that word.

Step 444 calls the BWPELTraining routine for the PEL with a list of the vectors time aligned against it in the portion of speech in which it was recognized. These vectors can be saved from time alignment performed by the speech recognition process, or it they can be determined by performing a new time alignment of the word's acoustic model against the frame vectors of the word's corresponding speech. When this call is made PELProb can be set equal to the score of the PEL's word in the recognition. This will have the effect of updating the WeightSums, WeightedVectorSums, and WeightedVarianceSums of the basis set associated with the PEL's SimilarAncestorNode as well as the Weight Sums of the individual PEL's mixture model based on flames time aligned against the PEL.

Once the PEL model and its associated shared basis set has been updated directly by step 444, steps 446 and 448 call has BWPELTraining for each of a set of related PELs. In the embodiment shown, this call is performed for each PEL which shares a SimilarAncestorNode with the recognized PEL. In other embodiments it could be performed for all PEL's which have a certain closeness to the recognized PEL in the same decision tree of the second tree set and whose mixture model had a certain degree of similarity with that of the recognized PEL. The call to BWPELTraining in step 448 is similar to that in step 444, except that the PELProb used to determine the weight given to the frames time aligned against the recognized PEL in updating the mixture model of the related PEL is decreased in proportion to the dissimilarity between the distributions represented by the mixture models of the two different PELs, as measured by some metric such as the Kullback-Liebler distance measure.

It can be seen that the present invention's use of an automatic classification scheme based on phonetic classification enables new training information time aligned against a given phonetic element, or PEL, model to be used to update models of other PELs which are both phonetically and acoustically similar. This enables a large set of PEL models to be adapted to a new speakers voice, or to changes in a given speaker's voice, with relatively little training data.

It should be appreciated that where the recognition of a sequence of words is considered reliable, the BWBatchTraining routine can be called to update PEL models. In such a scheme, the BWBatchTraining could be modified to perform the updating of related PELs in a manner analogous to that used in the AdaptiveTraining routine of FIG. 43.

It should be understood that the foregoing description and drawings are given merely to explain and illustrate the invention and that the invention is not limited thereto except insofar as the interpretation of the appended claims are so limited. Those skilled in the art who have the disclosure before them will be able to make modifications and variations therein without departing from the scope of the invention.

For example, the broad functions described in the claims below, like virtually all computer functions, can be performed by many different programming and data structures, and by using different organization and sequencing. This is because programming is an extremely flexible art form in which a given idea of any complexity, once understood by those skilled in the art, can be manifested in a virtually unlimited number of ways.

Furthermore, it should be understood that the invention of the present application is not limited to use with any one type of operating system, computer, or speech recognition system. For example, it is not limited to use on Von Neumann computers, but could be used on non-Von Neumann computers as well. Its features can be used on multi-processing computers, including massively parallel ones, neural net computers, as well as computers using different types of device physics, such as quantum effect devices or biochemical devices, to accomplish their computations. The present invention could be used with both continuous and discrete speech recognition systems, and with speech recognition systems which use other schemes for representing utterances to be recognized and other schemes for representing vocabulary words than mixture models formed of weighted gaussian distributions. In fact, certain aspects of the invention can be used with pattern recognizers other than speech recognizers.

It should be understood that the training program used in other embodiments of the invention can build a different number of sets of decision trees. In some embodiments the only one set of decision trees is built and the same set of decision trees used to get the clusters of PIC nodes used for linear discriminant analysis is used for determining which PIC nodes share PEL models and which PEL models share SimilarAncestorNodes. In other embodiments, multiple iterations can be made of the process of building a decision tree to cluster PIC nodes, using linear discriminant analysis to calculate a new set of parameters, calculating new values for the vectors of the PIC nodes using the new parameters, and then repeating the process with the new parameters. Such iteration would tend to improve the parameters selected by the linear discriminant analysis.

In other embodiments of the invention, different types of phoneme-in-context models could be used. The majority of PIC models could have more or fewer PIC nodes than the three PIC nodes described above. In addition, PIC's could have associated with them either more complex or more simple contexts for each phoneme than the triphone contexts defined by a PIC's phoneme and the immediately preceding and immediately following phoneme.

A simpler PIC context could be used, for example, in speech recognizers which wants to recognize speech sounds for which no following phoneme context has been hypothesized. In this case, a process of training PEL models similar to that described by the Training program of FIG. 4 could be performed in which the PIC context consisted only of the PIC's phoneme and the phoneme which preceded it.

More complex PIC contexts could be used in many ways. They could, for example, take into account whether or not a PIC's phoneme occurs before, and relatively close, to a silence. This would take into account pre-pausal lengthening, the strong tendency of speech sounds spoken just before a silence to be lengthened considerably. The phonetic context could also take into account phonemes more than one phoneme before or after a given PIC's phoneme. The phonetic context could even take into account differences in the PIC's own phoneme, such as its level of stress or, in languages, such as Chinese, in which pitch is used to distinguish between phonemes, its pitch. In such cases a single generalized PIC model could be built for occurrences of the phoneme with different stresses or pitches.

Proper use of such more complicated PIC contexts would normally require a more complex set of classification rules to be used by the decision three. For example, when the phonetic context involved stress or pitch, the classification rules available for use by the decision trees would include rules relating to stress or pitch, respectively. Of course, the use of more complex PIC contexts would tend to significantly increase the number of PICs, the amount of computation required for training, the size of tree sets, and the number of PEL models.

In the embodiments of the invention described above, the decision made as to what classification rule is to be used at each node of a decision tree and which nodes are to be marked as SimilarAncestorNodes are both performed by measuring the improvement in distribution modeling produced by extending the branch of the current tree node with two child nodes. In other embodiments, the decisions made at each tree node could be based on looking at all the possible improvement in modeling which could be achieved by extending the current branch by multiple levels down the tree. This would require more computation, but would be more likely to build optimal decision trees. Also in other embodiments, decision trees can be used in which an individual node can have more than two child nodes.

In other embodiments of the invention other types of classification rules could be used. For example, an important aspect of the invention relates to using human selected classification rules to group together sound elements which according to linguistic knowledge should represent related sounds. Such rules need not be limited to the sets of preceding and following phonemes described with regard to the preferred embodiment, but could include other, different, measures of context, such as rules including more complex logical functions such as NOT, AND, and OR operators. In some embodiments of the invention, however, automatically derived classification rules could be used. For example, computerized modeling of the acoustic characteristics associated with the position of the vocal tract associated with different phonemes could be used to determine which phonetic classifications rules should produce acoustically similar sounds, and, thus, which should be available for use in the decision trees of the present invention.

It should also be understood that the number of phonemes used can vary in different embodiments. Not only do different speech experts use different number of phonemes for a given language, but commonly the same speech experts find that different languages contain different number of phonemes. For example, Spanish is normally considered to have fewer phonemes than English. Also, different numbers and types of parameters, and different frame durations, can be used in different embodiments of the invention. In fact, one of the advantage of the linear discriminant analysis of the present invention, is that the relative weighting its L-matrix provides to various members of the original set of p-parameters provides information about which of those initial parameters are most valuable, enabling a new, different set of p-parameters to be used in a different iteration of the entire training process.

```
;Revisions:
; 18-Oct-94 MJN
; put in hesitation noises U and M (but not S)
; 11-Oct-94 LG
; removed singletons (schwa and s)
; 19-Apr-94 LG
; took out questions involving syllabic consonants
;;;;; QUESTIONS FOR THE DECISION TREE in English
; VOWELS 8
aáäâeéiioóóuúüÖÜR@           ;Vowel
aáäâeéiioóóuúüÖÜR@wy         ;Vowel/Glide
aáäâeéiioóóuUúüÖÜR@          ;Vowel and hes
aáäâeéiioóóuUúüÖÜR@wy        ;Vowel/Glide and
hes
;@                            ;Schwa
yw                            ;Glide
; /Ü/ may be approx. equal to either [aú] or [aü], and
; /ó/ to [óú] or [uú]
; Front Vowels 11
éáíÖy__                       ;VHiFrTense
éáíÖyi__                      ;VHiFr
éáíÖyieaâ__                   ;VFr
éáíÖyieâ__                    ;VNonLoFr
ea__                          ;VNonHiFr
                              ;
__éy                          ;VHiFrTense
__éyi                         ;VHiFr
__éyiáeaâ                     ;VFr
__éyiáeâ                      ;VNonLoFr
__eaÜ                         ;VNonHiFr if /Ü/ = [aü]
__ea                          ;VNonHiFr if /Ü/ = [aü]
; Back Vowels 18
óúÜw__                        ;VHiBackRoundTense
óúÜwü                         ;VHiBackRound
óúÜwüéáíÖyi__                 ;VHigh
óóúÜwüuoä__                   ;VBack
óóúÜwüuUoä__                  ;VBack and hes
óuäo__                        ;VNonHiBack
óuUäo__                       ;VNonHiBack and hes
óuäaeo__                      ;VNonHi
óuUäaeo__                     ;VNonHi and hes
óuäaeo@__                     ;VNonHi incl. @
óuUäaeo@__                    ;VNonHi incl. @ and hes __úw                          ;VHiBackRoundTense
__úwü                         ;VHiBackRound
__úwüéyi                      ;VHigh
__óóúÜwüuäo                   ;VBack if /Ü/ = [aü]
__óóúÜwüuUäo                  ;VBack if /Ü/ = [aü] and hes
__óóúwüuäo                    ;VBack if /Ü/ = [aü]
__óóúwüuUäo                   ;VBack if /Ü/ [aü] and hes
__óuäoióÜÖ                    ;VNonHiBk if /Ü/ = [aü]
__óuUäoióÜÖ                   ;VNonHiBk if /Ü/ = [aü] and hes
__óuäoióÖ                     ;VNonHiBk if /Ü/ = [aü]
__óuUäoióÖ                    ;VNonHiBk if /Ü/ = [aü] and hes
__äoóuaeíÜÖáó                 ;VNonHi
__äoóuUaeíÜÖáó                ;VNonHi and hes
__äoóuaeíÜÖáó@                ;VNonHi incl. @
__äoóuUaeíÜÖáó@               ;VNonHi incl. @ and hes
äao                           ;VLow
; ROUNDING 14
óúÜwüó__                      ;VRound
__óúÜwüóÖ                     ;VRound if /ó/ = [óú]
```

-continued

| | |
|---|---|
| _úÜwüôÖ | ;VRound if /ó/ = [uú] ; |
| róúÜwüô_ | ;rounding |
| _róúÜwüôÖ | ;rounding if /ó/ = [ôú] |
| _rúÜwüôÖ | ;rounding if /ó/ = [uú] |
| rRóúÜwüô_ | ;rounding incl. R |
| _rRóúÜwüôÖ | ;rounding incl. R if /ó/ = [ôú] |
| _rRúÜwüôÖ | ;rounding incl. R if /ó/ = [uú] |
| @R | ;central vowel |
| Rr | ;r-color |
| rR_rR | ;r-color surroundings |
| ; CONSONANTS | |
| ; By Place | |
| ; labials 7 | |
| pbfv | ;LabObstr |
| pbfvm | ;LabC |
| pbfvmM | ;LabC and hes |
| pbfvmw | ;Lab |
| pbfvmMw | ;Lab and hes |
| pbfvmw_pbfvmw | ;labial surroundings |
| pbfvmMw_pbfvmMw | ;labial surroundings and hes |
| ; alveolars/dentals 7 | |
| tdsz | ;AlvObstr |
| tdsznl | ;Alv |
| Θδ | ;post/inter-dental slit fricatives |
| tdsznl_tdsznl | ;alveolar surroundings |
| ; palatals 12 | |
| ¢jσΣy | ;CPal |
| ; and a lot of one-sided questions because of the affricates | |
| _t¢ | ;VlAlv/Palstop/Affr |
| _dj | ;VdAlv/PalStop/Affr |
| _t¢dj | ;Alv/PalStop/Affr |
| _jy | ;VdPal |
| _¢jy | ;Pal |
| σ¢_ | |
| Σj_ | |
| σ¢Σj_ | |
| Σjy_ | |
| ¢jσΣy_¢jσΣy | ;palatal surroundings |
| ; velars 3 | |
| kgñ | ;Vel |
| kgñ_kgñ | ;velar surroundings |
| ; By Manner | |
| ; stops 6 | |
| ptkbdg | ;Stop |
| ptk | ;VlStop |
| bdg | ;VdStop |
| ; stops and affricates 6 | |
| ptk¢bdgj | ;Stop/Affr |
| ptk¢ | ;VlStop/Affr |
| bdgj | ;VdStop/Affr |
| ; fricatives 6 | |
| fΘsσvδzΣ | ;Fric |
| fΘsσ | ;VlFric |
| vδzΣ | ;VdFric |
| ; fricatives and affricates 2 | |
| fΘsσ¢_ | ;VlFric/Affr |
| vδzΣj_ | ;VdFric/Affr |
| ; voiceless, ± silence 6 | |
| pftΘsσ¢kh | |
| pftΘsσ¢kh_pftΘsσ¢kh | ;voiceless surroundings |
| pftΘsσ¢kh# | |
| pftΘsσ¢kh#_pftΘsσ¢kh# | ;voiceless surroundings |
| ; nasals 9 | |
| mnñ | ;nasal |
| mMnñ | ;nasal and hes |
| ;mnñMN_mnñMN | ;nasal surroundings |
| #h | ;h or Silence |
| ;s | |
| sz | |
| sz_sz | ;especially good for @ and i |
| ;nN | |
| ;mM | |
| ;L-- | |

What we claim is:

1. A computerized method for automatically creating models of speech sounds to be used in speech recognition comprising the steps of:

receiving training signals representing the sound of spoken words;

storing a plurality of phonetic context units, each representing a speech sound in a phonetic context defined by one or more phonetic features, and associating with each phonetic context unit an initial acoustic model to represent its associated speech sound;

time aligning successive time frames of the training signals against the initial models of the phonetic context units of the words corresponding to those training signals, to associate each frame with the phonetic context unit whose sound it represents;

storing a set of classifications, each representing a possible set of one or more of the phonetic features which can be associated with one of said phonetic context units;

using an automatic classification routine to select a plurality of sub-sets of said classifications which divide the phonetic context units into phonetic context groups, such that the phonetic context units in each such phonetic context group tend to be time aligned against acoustically similar frames;

developing shared acoustic model components for a plurality of phonetic context groups whose associated sub-sets of classifications share a sub-sub-set of classifications and whose frames have a certain acoustic similarity, which shared acoustic model components contain statistical information derived from frames time aligned against the phonetic context units in different ones of said plurality of phonetic context groups; and developing an acoustic model for each given phonetic context group in said plurality of phonetic context groups which contains a combination of said statistical information contained in the model components shared by said plurality of groups and more specific statistical information representing the frames time aligned against the phonetic context units in the given individual phonetic context group.

2. A computerized method as in claim 1 wherein:

said classification routine builds a decision tree to select the plurality of sub-sets of classifications used to divide the phonetic context units into phonetic context groups; and said plurality of phonetic context groups which share a sub-sub-set of classifications are descendants from a common ancestor node in a common decision tree.

3. A computerized method for automatically creating models of speech sounds to be used in speech recognition comprising the steps of:

receiving training signals representing the sound of spoken words;

storing a plurality of phonetic context units, each representing a speech sound in a phonetic context defined by one or more phonetic features, and associating with each phonetic context unit an initial acoustic model to represent its associated speech sound;

time aligning successive time frames of the training signals against the initial models of the phonetic context units of the words corresponding to those training signals, to associate each frame with the phonetic context unit whose sound it represents;

storing a set of classifications, each representing a possible set of one or more of the phonetic features which can be associated with one of said phonetic context units;

using an automatic classification routine to select a plurality of sub-sets of said classifications which divide the phonetic context units into phonetic context groups, such that the phonetic context units in each such phonetic context group tend to be time aligned against acoustically similar frames;

developing shared acoustic model components for a plurality of phonetic context groups whose associated sub-sets of classifications share a sub-sub-set of classifications, and whose frames have a certain acoustic similarity; and developing an acoustic model for each phonetic context group in said plurality of phonetic context groups based both on the model components shared by said plurality of groups and on the frames associated with the phonetic context units in the individual phonetic context group;

wherein:

said classification routine builds a decision tree to select the plurality of sub-sets of classifications used to divide the phonetic context units into phonetic context groups;

said plurality of phonetic context groups which share a sub-sub-set of classifications are descendants from a common ancestor node in a common decision tree;

the acoustic model components shared by a set of phonetic context groups having a common ancestor node are a set of probability distribution models, each representing a possible distribution of multi-dimensional acoustic values associated with frames time aligned against the phonetic context units of said set of phonetic context groups; and the acoustic model developed for an individual phonetic context group is a mixture model made up of a weighted sum of such a set of distribution models, with each distribution model in the set being weighted so the sum of such models better represents the distribution of frame values associated with the individual phonetic context group.

4. A computerized method as in claim 3 further including the steps of:

creating a mixture model for each common ancestor node by weighting the set of distribution models associated with such a common ancestor node to better represent the distribution of frame values of all the phonetic context groups sharing that common ancestor node;

using the mixture models for a common ancestor node as a temporary model for each of its associated phonetic context groups; and repeating the following succession of steps one or more times:

time aligning the successive frames of training signals against the phonetic context group models of the phonetic context units of the words corresponding to those training signals;

using the frames time aligned against all the phonetic context groups sharing a common ancestor node to update each of the common ancestor nodes's set of associated distribution models; and using the frames time aligned against each phonetic context group to update the weighting associated with each of the probability distributions associated with the mixture model for that phonetic context group.

5. A computerized method as in claim 3 further including the steps of:

receiving additional signals representing additional sounds of spoken words;

time aligning successive frames of the additional signals against the models of phonetic context groups corresponding to the phonetic context units of the words corresponding to those additional signals, to associate each additional frame with the phonetic context group whose sound it represent; and using acoustic data from one or more of said additional frames associated with a given phonetic context group to update the acoustic models of a phonetic context group other than the given phonetic context group as a function of the closeness of common ancestry in said decision tree, and the acoustic similarity of frames, of the given and the other phonetic context group.

6. A computerized method as in claim 3 wherein said phonetic context units each represent one of a sequence of nodes in a multi-node phoneme-in-context model representing a given phoneme in a given context defined by at least its preceding and/or following phonemes, where the sequence of phonetic context units in the multi-node model represent a sequence of speech sounds associated with the phoneme in said given context.

7. A computerized method as in claim 6 wherein said classification routine creates a separate decision tree for each node of a generalized phoneme-in-context model created for each phoneme representing that phoneme in multiple contexts represented by a plurality of its phoneme-in-context models.

8. A computerized method as in claim 3 wherein said set of classifications used by said decision tree classification routine represents a sub-set of all possible sets of phonetic features, which sub-set is selected by a human based on linguistic knowledge of which phonetic features are likely to be associated with acoustical similarity.

9. A computerized method for automatically creating models of speech sounds to be used in speech recognition comprising the steps of:

receiving training signals representing the sound of spoken words;

storing a plurality of phonetic context units, each representing a speech sound in a phonetic context defined by one or more phonetic features, and associating with each phonetic context unit an initial acoustic model to represent its associated speech sound;

time aligning successive time frames of the training signals against the initial models of the phonetic context units of the words corresponding to those training signals, to associate each frame with the phonetic context unit whose sound it represents;

storing a set of classifications, each representing a possible set of one or more of the phonetic features which can be associated with one of said phonetic context units;

using an automatic classification routine to select a plurality of sub-sets of said classifications which divide the phonetic context units into phonetic context groups, such that the phonetic context units in each such phonetic context group tend to be time aligned against acoustically similar frames;

developing an acoustic model for each phonetic context group in said plurality of phonetic context groups based on the frames associated with the phonetic context units in that phonetic context group;

receiving additional signals representing additional sounds of spoken words;

time aligning successive time frames of the additional signals against the models of phonetic context groups corresponding to the phonetic context units of the words corresponding to those additional signals, to associate each such additional frame with a phonetic context group; and automatically combining acoustic data from an additional frame time aligned against a given phonetic context group into the acoustic models of a different phonetic context group which shares a sub-sub-set of said classifications with, and whose associated frames have a given acoustic similarity to, said given phonetic context group.

10. A computerized method for automatically creating models of speech sounds to be used in speech recognition comprising the steps of:

receiving training signals representing the sound of spoken words;

storing a plurality of phonetic context units, each representing a speech sound in a phonetic context defined by one or more phonetic features, and associating with each phonetic context unit an initial acoustic model to represent its associated speech sound using p-parameters;

time aligning successive time frames of the training signals represented in said p parameters, against the initial models of the phonetic context units of the words corresponding to those training signals, to associate each frame with the phonetic context unit whose sound it represents;

storing a set of classifications, each representing a possible set of one or more the phonetic features which can be associated with one of said phonetic context units;

using an automatic classification routine to select a plurality of sub-sets of said classifications which divide the phonetic context units into phonetic context groups, such that the phonetic context units in each such phonetic context group tend to be time aligned against acoustically similar p-parameter frames;

using an automatic parameter selection routine to select a new set of q acoustic parameters derived from said p parameters, where q is less than p, which, for a given q, produces a relatively optimal separation between the sets of frames associated with each phonetic context group; and using said q parameters to build a set of second acoustic models, for use in speech recognition, to represent said phonetic context units.

11. A computerized method as in claim 10 wherein said automatic parameter selection routine performs linear discriminant analysis to produce an L matrix which converts said p parameters into said q parameters.

12. A computerized method for automatically creating models of speech sounds to be used in speech recognition comprising the steps of:

receiving training signals representing the sound of spoken words;

storing a plurality of phonetic context units, each representing a speech sound in a phonetic context defined by one or more phonetic features, and associating with each phonetic context unit an initial acoustic model to represent its associated speech sound using p-parameters;

time aligning successive time frames of the training signals represented in said p parameters, against the initial models of the phonetic context units of the words corresponding to those training signals, to associate each frame with the phonetic context unit whose sound it represents;

storing a set of classifications, each representing a possible set of one or more the phonetic features which can be associated with one of said phonetic context units;

using an automatic classification routine to select a plurality of sub-sets of said classifications which divide the phonetic context units into phonetic context groups, such that the phonetic context units in each such phonetic context group tend to be time aligned against acoustically similar p-parameter frames;

using an automatic parameter selection routine to select a new set of q acoustic parameters derived from said p parameters, where q is less than p, which, for a given q, produces a relatively optimal separation between the sets of frames associated with each phonetic context group; and using said q parameters to build a set of second acoustic models, for use in speech recognition, to represent said phonetic context units, wherein:

said automatic parameter selection routine performs linear discriminant analysis to produce an L matrix which converts said p parameters into said q parameters, said classification routine builds a decision tree to select the plurality of sub-sets of classifications used to divide the phonetic context units into phonetic context groups.

13. A computerized method as in claim 12 wherein said set of classifications used by said decision tree classification routine represents a sub-set of all possible sets of phonetic features, which sub-set is selected by a human based on linguistic knowledge of which phonetic features are likely to be associated with acoustical similarity.

14. A computerized method as in claim 12 wherein said using of said q parameters to build a set of second acoustic models, for use in speech recognition, to represent said phonetic context units, includes:

using said L matrix to convert frames of training signals represented in said p parameters into frames represented by said q parameters;

using said automatic decision tree classification routine to build a new tree to select a new plurality of sub-sets of said classifications which divide the phoneme context units into groups, such that the phonetic context units in each such phonetic context group tend to be associated with acoustically similar q-parameter frames; and developing a q-parameter acoustic model for each phonetic context group created by said decision tree classification based on the frames associated with the phonetic context units in that group.

15. A computerized method as in claim 12 wherein said phonetic context units each represent one of a sequence of nodes in a multi-node phoneme-in-context model representing a given phoneme in a given context defined by at least its preceding and/or following phonemes, where the sequence of phonetic context units in the multi-node model represent a sequence of speech sounds associated with the phoneme in said given context.

16. A computerized method as in claim 15 wherein said classification routine creates a separate decision tree for each node of a generalized phoneme-in-context model created for each phoneme representing that phoneme in multiple contexts represented by a plurality of its phoneme-in-context models.

* * * * *